US012610184B2

(12) United States Patent
Kim

(10) Patent No.: US 12,610,184 B2
(45) Date of Patent: Apr. 21, 2026

(54) ELECTRONIC DEVICE AND CONTROL METHOD

(71) Applicant: SAMSUNG ELECTRONICS CO., LTD., Suwon-si (KR)

(72) Inventor: Sangheon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 304 days.

(21) Appl. No.: 18/116,148

(22) Filed: Mar. 1, 2023

(65) Prior Publication Data

US 2023/0209255 A1     Jun. 29, 2023

Related U.S. Application Data

(63) Continuation of application No. PCT/KR2021/008974, filed on Jul. 13, 2021.

(30) Foreign Application Priority Data

Sep. 1, 2020     (KR) ........................ 10-2020-0111324

(51) Int. Cl.
*H04R 3/00*          (2006.01)
*G06F 3/16*          (2006.01)
(Continued)

(52) U.S. Cl.
CPC ............. *H04R 3/005* (2013.01); *G06F 3/162* (2013.01); *H04N 23/63* (2023.01); *H04R 1/028* (2013.01);
(Continued)

(58) Field of Classification Search
CPC ........ H04R 3/005; H04R 1/028; H04R 1/326; H04R 5/027; H04R 29/008;
(Continued)

(56) References Cited

U.S. PATENT DOCUMENTS

| | | | |
|---|---|---|---|
| 8,379,736 B2 | 2/2013 | Santhoff et al. | |
| 8,798,029 B2 | 8/2014 | Soliman | |

(Continued)

FOREIGN PATENT DOCUMENTS

| | | | | |
|---|---|---|---|---|
| CN | 110113494 A | * | 8/2019 | ............... G11C 7/16 |
| CN | 111148036 A | | 5/2020 | |

(Continued)

OTHER PUBLICATIONS

International Search Report (PCT/ISA/210) dated Oct. 27, 2021 issued by the International Searching Authority in International Application No. PCT/KR2021/008974.

(Continued)

*Primary Examiner* — Carolyn R Edwards
*Assistant Examiner* — Kuassi A Ganmavo
(74) *Attorney, Agent, or Firm* — Sughrue Mion, PLLC

(57) ABSTRACT

Disclosed are an electronic device and a control method. The electronic device comprises a communication interface for communicating with an external apparatus in a UWB manner, a microphone, a camera, a sensor, a display, and a processor, wherein the processor obtains distance information and angle information with respect to the external apparatus, on the basis of data received from the external apparatus, obtains photographing direction information, on the basis of a detected direction of the camera, identifies the external apparatus, on the basis of the acquired photographing direction information, distance information, and angle information, controls the microphone or communication interface to acquire an audio signal, on the basis of a distance from the external apparatus, and controls the display to display a UI indicating the amplitude of the acquired audio signal, together with a displayed image.

17 Claims, 24 Drawing Sheets

(51) Int. Cl.

| | |
|---|---|
| *H04M 1/72412* | (2021.01) |
| *H04N 23/63* | (2023.01) |
| *H04R 1/02* | (2006.01) |
| *H04R 1/32* | (2006.01) |
| *H04R 5/027* | (2006.01) |
| *H04R 29/00* | (2006.01) |
| *H04S 3/00* | (2006.01) |

(52) U.S. Cl.
CPC ............. *H04R 1/326* (2013.01); *H04R 5/027* (2013.01); *H04R 29/008* (2013.01); *H04S 3/008* (2013.01); *H04M 1/72412* (2021.01); *H04R 2499/11* (2013.01); *H04S 2400/01* (2013.01); *H04S 2400/13* (2013.01)

(58) Field of Classification Search
CPC ..... H04R 2499/11; H04N 23/63; G06F 3/162; H04S 3/008; H04S 2400/01; H04S 2400/13; H04M 1/72412
See application file for complete search history.

(56) References Cited

U.S. PATENT DOCUMENTS

| | | | |
|---|---|---|---|
| 9,282,282 B2 | 3/2016 | Jeong | |
| 9,516,241 B2 | 12/2016 | Kim et al. | |
| 9,805,724 B2 | 10/2017 | Kim et al. | |
| 10,064,148 B2 | 8/2018 | Xia | |
| 10,142,778 B2 | 11/2018 | Banerjea | |
| 10,216,469 B2 | 2/2019 | Kang et al. | |
| 11,120,818 B2* | 9/2021 | Magnusson ............ | H04N 9/806 |
| 11,137,491 B2 | 10/2021 | Kim et al. | |
| 2010/0225541 A1* | 9/2010 | Hertzog .................... | G01S 5/10 |
| | | | 342/387 |
| 2011/0275317 A1* | 11/2011 | Ryu .................... | H04M 1/2757 |
| | | | 348/222.1 |
| 2012/0128160 A1* | 5/2012 | Kim ....................... | H04R 3/005 |
| | | | 381/17 |
| 2012/0163610 A1* | 6/2012 | Sakagami ................. | H04S 7/30 |
| | | | 381/56 |
| 2014/0002574 A1 | 1/2014 | Jeong | |
| 2014/0098651 A1* | 4/2014 | Adachi ........... | G11B 20/10527 |
| | | | 369/4 |
| 2014/0235290 A1* | 8/2014 | Cho .................... | H04M 1/6058 |
| | | | 455/550.1 |
| 2014/0362253 A1 | 12/2014 | Kim et al. | |
| 2015/0296317 A1 | 10/2015 | Park et al. | |
| 2016/0064002 A1 | 3/2016 | Kim et al. | |
| 2016/0174006 A1* | 6/2016 | Lee ......................... | H04R 3/12 |
| | | | 381/77 |
| 2016/0313963 A1 | 10/2016 | Kang et al. | |
| 2016/0360332 A1* | 12/2016 | Shin ......................... | H04M 1/60 |
| 2017/0125035 A1 | 5/2017 | Gao et al. | |
| 2017/0140644 A1* | 5/2017 | Hwang ................. | G08C 17/02 |
| 2018/0225080 A1* | 8/2018 | Geng ...................... | G06F 3/165 |
| 2018/0262849 A1* | 9/2018 | Farmani .............. | H04R 25/407 |
| 2018/0350405 A1* | 12/2018 | Marco ................. | G11B 27/031 |
| 2019/0026067 A1* | 1/2019 | Baek ....................... | G06F 3/165 |
| 2019/0235916 A1* | 8/2019 | Min ....................... | G06F 3/048 |
| 2019/0356176 A1* | 11/2019 | Lee .......................... | H02J 50/80 |
| 2020/0021772 A1* | 1/2020 | Xiong ...................... | G06F 9/485 |
| 2020/0029160 A1* | 1/2020 | El-Hoiydi ........... | H04R 25/604 |
| 2020/0150262 A1 | 5/2020 | Kim et al. | |
| 2021/0084439 A1* | 3/2021 | Alameh ................ | H04W 4/023 |
| 2022/0026559 A1 | 1/2022 | Kim et al. | |

FOREIGN PATENT DOCUMENTS

| | | |
|---|---|---|
| CN | 111526476 A | 8/2020 |
| EP | 2990938 A1 | 3/2016 |
| JP | 2003-163829 A | 6/2003 |
| JP | 2020-12704 A | 1/2020 |
| KR | 10-2014-0003974 A | 1/2014 |
| KR | 10-2014-0060003 A | 5/2014 |
| KR | 10-1443210 B1 | 11/2014 |
| KR | 10-2014-0144410 A | 12/2014 |
| KR | 10-2016-0026317 A | 3/2016 |
| KR | 10-2016-0125190 A | 10/2016 |
| KR | 10-2017-0086393 A | 7/2017 |
| KR | 10-1902715 B1 | 9/2018 |
| KR | 10-2020-0052864 A | 5/2020 |
| KR | 10-2020-0054006 A | 5/2020 |

OTHER PUBLICATIONS

Written Opinion (PCT/ISA/237) dated Oct. 27, 2021 issued by the International Searching Authority in International Application No. PCT/KR2021/008974.

Communication issued on Jun. 20, 2024 by the China National Intellectual Property Administration for Chinese Patent Application No. 202180053291.9.

Communication issued Dec. 15, 2023 by European Patent Office issued in European Patent Application No. 21864523.2.

Office Action issued on Feb. 7, 2024 by China National Intellectual Property Administration in Chinese Patent Application No. 202180053291.9.

Communication dated Mar. 28, 2025 issued by the Korean Intellectual Property Office in Korean Patent Application No. 10-2020-0111324.

* cited by examiner

| CHANNEL | 1 | 2 | 3 | 4 | 5 | 6 | 7 | 8 |
|---|---|---|---|---|---|---|---|---|
| DIRECTIONAL CHANNEL | Left | Right | Front-Left | Front-Right | Front-Center | Back-Left | Back-Right | Back-Center |
| MICROPHONE CHANNEL | MIC1 | MIC2 | MIC3 | MIC4 | MIC5 | MIC6 | MIC7 | MIC8 |

ELECTRONIC DEVICE AND CONTROL METHOD

CROSS-REFERENCE TO RELATED APPLICATIONS

This application is a by-pass continuation of International Application No. PCT/KR2021/008974, filed on Jul. 13, 2021, which is based on and claims priority to Korean Patent Application No. 10-2020-0111324, filed on Sep. 1, 2020, in the Korean Intellectual Property Office, the disclosures of which are incorporated by reference herein in their entireties.

BACKGROUND

1. Field

The disclosure relates to an electronic device and a control method, and more particularly, to an electronic device communicating in an ultra-wide band (UWB) manner, and a control method thereof.

2. Description of Related Art

Recently, a 5G communications method has been commercialized, and high-end electronic devices including smartphones have been developed. Smartphones used to include one camera and one microphone. Recently released smartphones include a plurality of cameras and a plurality of microphones and may perform various functions.

However, even in the case of recently released smartphones, sound of some subjects are not heard properly during capturing video if the subjects are at a long distance or if there is surrounding noise, in many cases. In addition, when a plurality of subjects exist during video capturing, it is not possible to selectively track and record only a specific subject. In addition, if one application occupies a microphone resource, another application cannot use the microphone resource due to chipset restrictions or the like. Therefore, multi-recording is impossible even in recent smartphones.

In addition, it is difficult for users to adjust a microphone level because it is impossible to adjust the volume or identify a magnitude of an input audio signal during video capturing, and the volumes recorded during video capturing vary depending on subjects or peripheral devices.

Therefore, there is a need for improved functions and quality related to audio signals in electronic devices including smartphones, such as tracking audio signals according to subjects during video capturing or equalizing magnitudes of recorded audio signals regardless of distance of the subjects or surrounding devices.

SUMMARY

Provided is an electronic device and a control method for controlling an audio signal of a subject by communicating with an external device using a ultra-wide band (UWB) communication method.

According to an aspect of the disclosure, an electronic device includes: a communication interface configured to communicate with an external device using ultra-wide band (UWB); a microphone configured to receive an audio signal; a camera configured to capture an image including a subject adjacent to the external device; a sensor configured to detect a direction of the camera; a display configured to display the captured image; at least one memory configured to store at least one instruction; and at least one processor, wherein the at least one processor is in operative communication with the communication interface, the microphone, the camera, the sensor, the display, and the memory, and is configured to execute the at least one instruction to: acquire ranging information and angle information with respect to the external device based on data received from the external device, acquire image capture direction information based on the direction of the camera detected by the sensor, identify the external device for acquiring an audio signal of the subject based on the acquired image capture direction information, ranging information, and angle information, control the microphone to acquire an audio signal of the subject when a distance to the external device is less than a predetermined distance, and control the communication interface to acquire the audio signal of the subject from the external device when the distance to the external device is greater than or equal to a predetermined distance, and control the display to display a user interface (UI) indicating a magnitude of the acquired audio signal together with the captured image.

The at least one processor may be further configured to execute the at least one instruction to: identify whether a record thread is in an active state, and based on identifying the record thread as being in an inactive state, perform an initial recording setting process to store the acquired audio signal, generate the record thread, generate a plurality of record tracks for the generated record thread, store data related to the acquired audio signal in the at least one memory based on the plurality of generated record tracks, and display the data on the display.

The initial recording setting process may include at least one of a codec setting process, an audio DSP setting process, a kernel driver setting process, or an audio hardware abstraction layer (HAL) setting process.

The at least one processor is further configured to execute the at least one instruction to: based on identifying the record thread as being in the active state, generate a plurality of record tracks related to the acquired audio signal, and connect the plurality of record tracks related to the acquired audio signal to the record thread in the active state to form multiple record threads.

The at least one processor may be further configured to execute the at least one instruction to identify a peak level of the acquired audio signal using at least one record track related to the audio signal from the plurality of generated record tracks.

The at least one processor may be further configured to execute the at least one instruction to control the display to display the identified peak level as a magnitude of the acquired audio signal.

The at lease one processor may be further configured to execute the at least one instruction to: determine whether the acquired audio signal satisfies a beamforming condition; based on determining that the acquired audio signal satisfies the beamforming condition, separate the acquired audio signal into a plurality of channels based on directionality and store the plurality of channels in the at least one memory, and based on determine that the acquired audio signal does not satisfy the beamforming condition, separate the acquired audio signal into a plurality of channels based on the number of microphones and store the plurality of channels in the at least one memory.

The at least one processor may be further configured to execute the at least one instruction to control a volume of the audio signal for each record track or each channel.

The at least one processor may be further configured to execute the at least one instruction to: control the communication interface to transmit a response request signal to the external device and to receive a response signal, and acquire the ranging information based on an elapsed time between a time at which the response request signal is transmitted to a time at which the response signal is received.

The microphone may include a directional microphone, and the at least one processor may be further configured to execute the at least on instruction to: mute an audio signal acquired through the microphone from a direction other than a direction in which the directional microphone is directed.

According to an aspect of the disclosure, a method of controlling an electronic device includes: capturing an image including a subject adjacent to an external device; acquiring ranging information and angle information with respect to the external device based on data received from the external device via ultra-wide band (UWB) communications; acquiring image capture direction information based on a direction of a camera detected by a sensor; identifying the external device for acquiring an audio signal of the subject based on the acquired image capture direction information, ranging information, and angle information; controlling a microphone to acquire an audio signal of the subject when a distance to the external device is less than a predetermined distance; acquiring the audio signal of the subject through the external device when the distance to the external device is greater than or equal to a predetermined distance; and displaying a user interface (UI) indicating a magnitude of the acquired audio signal together with the captured image.

The method may further include: identifying whether a record thread is in an active state; based on identifying the record thread as being in an inactive state, performing an initial recording setting process to store the acquired audio signal in a memory, generating the record thread, generating a plurality of record tracks for the generated record thread, and storing and displaying data related to the acquired audio signal based on the plurality of generated record tracks.

The initial recording setting process comprises at least one of a codec setting process, an audio DSP setting process, a kernel driver setting process, or an audio hardware abstraction layer (HAL) setting process.

The method may further include: based on identifying the record thread as being in the active state, generating a plurality of record tracks related to the acquired audio signal, and connecting the plurality of record tracks related to the acquired audio signal to the record thread in the active state to form multiple record threads.

The method may further include: identifying a peak level of the acquired audio signal using at least one record track related to the audio signal from the plurality of generated record tracks.

According to an aspect of the disclosure, an electronic device includes: a camera configured to capture an image including a subject adjacent to one or more external devices; a sensor configured to detect a direction of the camera; a communication interface configured to communicate with an external device from among the one or more external devices using ultra-wide band (UWB); a microphone configured to receive an audio signal; a display configured to display the captured image; at least one memory configured to store at least one instruction; and at least one processor, wherein the at least one processor is in operative communication with the communication interface, the microphone, the camera, the sensor, the display, and the memory, and is configured to execute the at least one instruction to: identify, based on the captured image, an external device that is adjacent to the subject from among the one or more external devices, acquire ranging information and angle information with respect to the identified external device based on data received from the identified external device, acquire image capture direction information based on the direction of the camera detected by the sensor, control the microphone to acquire an audio signal of the subject when a distance to the identified external device is less than a predetermined distance, control the communication interface to acquire the audio signal of the subject from the identified external device when the distance to the identified external device is greater than or equal to a predetermined distance, and control the display to display a user interface (UI) indicating a magnitude of the acquired audio signal together with the captured image.

The at least one processor may be further configured to execute the at least one instruction to: identify whether a record thread is in an active state, and based on identifying the record thread as being in an inactive state, perform an initial recording setting process to store the acquired audio signal, generate the record thread, generate a plurality of record tracks for the generated record thread, store data related to the acquired audio signal in the at least one memory based on the plurality of generated record tracks, and display the data on the display.

The at least one processor may be further configured to execute the at least one instruction to: based on identifying the record thread as being in the active state, generate a plurality of record tracks related to the acquired audio signal, and connect the plurality of record tracks related to the acquired audio signal to the record thread in the active state to form multiple record threads.

The at lease one processor may be further configured to execute the at least one instruction to: determine whether the acquired audio signal satisfies a beamforming condition; based on determine that the acquired audio signal satisfies the beamforming condition, separate the acquired audio signal into a plurality of channels based on directionality and store the plurality of channels in the at least one memory, and based on determine that the acquired audio signal does not satisfy the beamforming condition, separate the acquired audio signal into a plurality of channels based on the number of microphones and store the plurality of channels in the at least one memory.

The at least one processor may be further configured to execute the at least one instruction to: control the communication interface to transmit a response request signal to the identified external device and to receive a response signal, and acquire the ranging information based on an elapsed time between a time at which the response request signal is transmitted to a time at which the response signal is received.

According to various embodiments of the disclosure, the electronic device and control method may improve user experience by operating an audio signal of a subject by communicating with an external device using a UWB communication method.

The effects of the disclosure are not limited to the effects mentioned above, and other effects not mentioned will be clearly understood by those skilled in the art from the description below.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a diagram illustrating channels of an audio signal according to an embodiment of the disclosure;

DETAILED DESCRIPTION

Figure 1:
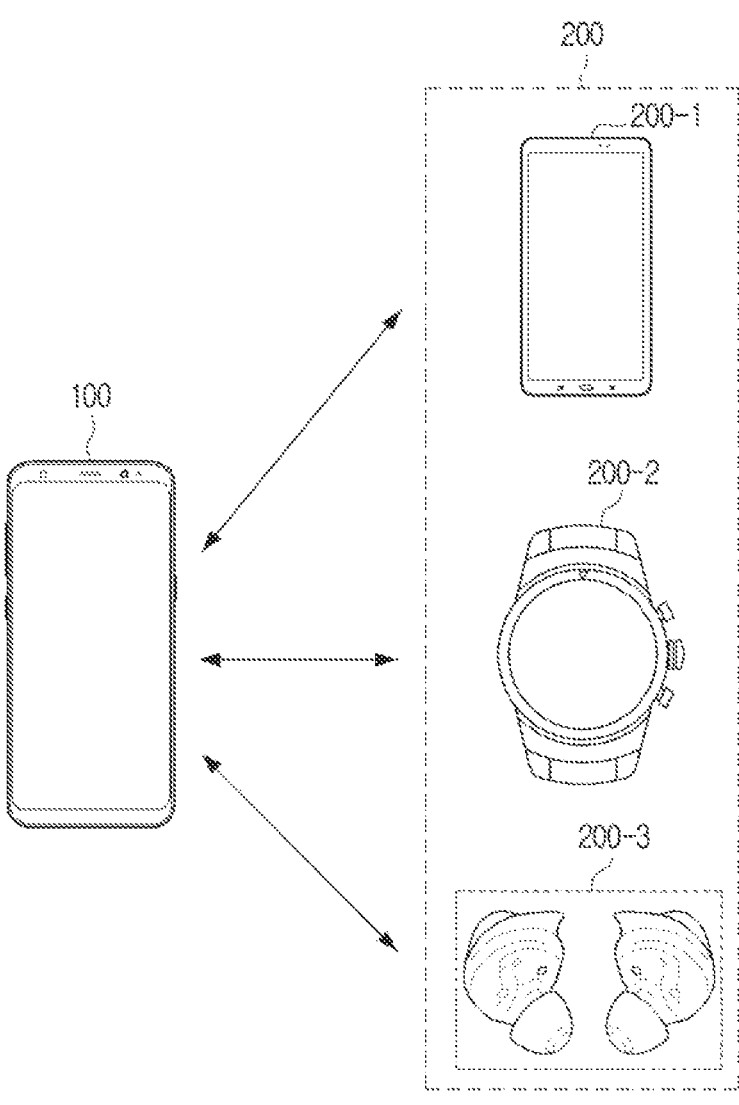
FIG. 1 is a diagram illustrating an ultra-wide band (UWB) based multi-audio operating method according to an embodiment of the disclosure.

Hereinafter, various embodiments will be described in detail with reference to the accompanying drawings. The embodiments described herein may be variously modified. Specific embodiments may be illustrated in the drawings and described in detail in the detailed description. It should be understood, however, that the specific embodiments disclosed in the accompanying drawings are intended only to facilitate understanding of various embodiments. Therefore, the technical idea is not limited by the specific embodiments disclosed in the accompanying drawings but includes all equivalents or alternatives falling within the spirit and scope of the disclosure.

Terms including ordinals, such as first, second, etc., may be used to describe various elements but such elements are not limited to the above terms. The above terms are used only for the purpose of distinguishing one component from another.

In this specification, the terms "comprise" or "have" and the like, are intended to specify the presence of stated features, integers, steps, operations, elements, parts, or combinations thereof, but do not preclude the presence or addition of one or more other features, integers, steps, operations, elements, components, or combinations thereof. It is to be understood that when an element is referred to as being "connected" to another element, it may be directly on or directly connected to the other element or layer, or intervening elements or layers may be present. When an element is referred to as being "directly connected" to another element, it should be understood that there are no other elements in between.

Elements or features referred to as "module" or "part" in the present specification perform at least one function or operation. Also, elements or features referred to as "module" or "part" may perform functions or operations by hardware, software, or a combination of hardware and software. Also, a plurality of "modules" or a plurality of "parts", except for a "module" or "part" to be performed in a specific hardware or performed in at least one processor, may be integrated into at least one module. The singular expressions include plural expressions unless the context clearly dictates otherwise.

In the description of the disclosure, order of each step should be understood to be non-limiting, unless a preceding step must be performed logically and temporally before a subsequent step. In other words, except for the exceptional case above, even if a process described as a subsequent step is performed before a process described as a preceding step, the nature of the disclosure is not affected and the claim should be defined regardless of order of the steps. In this disclosure, "A or B" is defined to refer to include both A and B as well as selectively indicating either A or B. It is also to be understood that the term "comprise" is intended to encompass other elements in addition to the elements listed as being included.

Ciphertext/decryption may be applied depending on need, and all expressions describing an information (data) transmission process herein should be interpreted to include cases of performing ciphertext/decryption, even if there are no separate mentions in this regard. Also, in the disclosure, expressions in forms, such as "transmit (transfer) from A to B" or "A receives from B" also include a case wherein an object is transmitted (transferred) or received while another medium is included in between, and the expressions do not necessarily express only a case wherein an object is directly transmitted (transferred) or received from A to B.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

Each embodiment described herein may be independently implemented or operated, and each embodiment may also be implemented or operated in combination.

FIG. 1 is a diagram illustrating a ultra-wide band (UWB)-based multi-audio operating method according to an embodiment of the disclosure.

Referring to FIG. 1, an electronic device 100 and an external device 200 are illustrated. The electronic device 100 executes an application. For example, the application may be an application that performs functions, such as video recording, moving picture recording, and voice recognition. The electronic device 100 captures an image including a subject in response to application execution. The subject may be located adjacent to the external device 200. In addition, there may be a plurality of subjects and a plurality of external devices 200. For example, as shown in FIG. 1, first to third external devices 200-1, 200-2, and 200-3 may be located around the electronic device 100.

In addition, the electronic device 100 may communicate with the external device 200 and receive data from the external device 200 using an ultra-wide band (UWB) communication method. For example, the data received from the external device 200 may include ranging information and angle information (e.g., arrival of angle (AOA)) of the external device 200 based on the electronic device 100. The electronic device 100 may determine a relative location between the electronic device 100 and the external device 200 based on ranging information and angle information received from the external device 200. The UWB communication method is a kind of short-range wireless communication technology using a very wide frequency bandwidth of about 500 MHz. The UWB communication method may transmit data at a speed of about 100 Mbps or higher and with low power.

The electronic device 100 acquires image capture direction information based on a direction of a camera detected by a sensor. Additionally, the electronic device 100 may improve accuracy of image capture direction information acquired by receiving GPS information. The electronic device 100 identifies the external device 200 for acquiring an audio signal of a subject based on the acquired image capture direction information, ranging information, and angle information. For example, when the identified external device 200 is closer than a predetermined distance, the electronic device 100 obtains an audio signal (e.g., voice) of the subject through a microphone included in the electronic device 100. That is, the electronic device 100 may receive an audio signal of a subject by the microphone. When the identified external device 200 is farther than the predetermined distance, the electronic device 100 acquires an audio signal of the subject through the external device 200. That is, the electronic device 100 may receive a subject audio signal from the external device 200 through the communication interface. As an example, the predetermined distance may be set to 0.5 m, 1 m, 1.5 m, and the like. The example described above is an embodiment, and the predetermined distance may be appropriately set according to performance of the microphone, directivity, and the like.

The electronic device 100 may analyze the acquired audio signal and the captured image. The electronic device 100 may identify a subject from a captured image. In addition, the electronic device 100 may determine an audio signal corresponding to the identified subject and determine a level (or magnitude) of the audio signal. The electronic device 100 displays a user interface (UI) indicating the level of the audio signal together with the captured image based on a determination result. The UI indicating the audio signal level may include augmented reality (AR). That is, the audio signal level may be displayed as AR. For example, the electronic device 100 may identify a first subject and a second subject by analyzing the captured image. Also, the electronic device 100 may determine a subject corresponding to the audio signal based on a distance and direction of the audio signal input to the microphone. Alternatively, the electronic device 100 may determine a subject corresponding to the audio signal based on the distance and direction of the external device 200. The electronic device 100 may map the identified subject to the corresponding audio signal. The electronic device 100 displays a UI including the level of the audio signal mapped to the identified subject.

For example, the electronic device 100 may include a smartphone, a tablet PC, a laptop computer, a navigation device, a slate PC, and a wearable device. Also, the external device 200 may include a smartphone, a tablet PC, a laptop computer, a navigation device, a slate PC, a wearable device, earphones, headphones, a microphone, a speaker, and the like. Hereinbelow, a configuration of the electronic device will be described.

Figure 2:
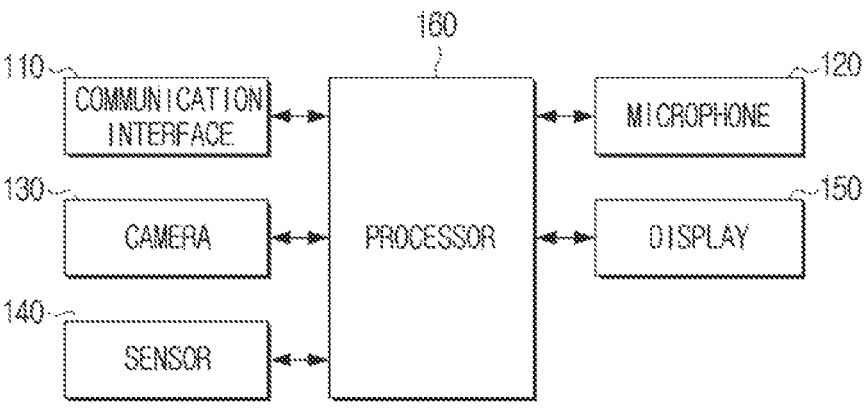
FIG. 2 is a block diagram illustrating a configuration of an electronic device according to an embodiment of the disclosure.
Figure 3:
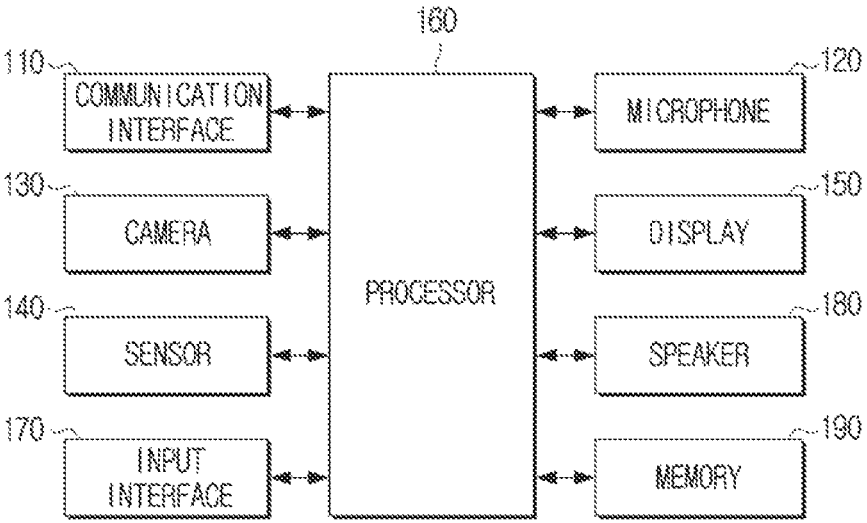
FIG. 3 is a block diagram of a specific configuration of an electronic device according to an embodiment of the disclosure.

FIG. 2 is a block diagram illustrating a configuration of an electronic device according to an embodiment of the disclosure, and FIG. 3 is a block diagram illustrating a specific configuration of an electronic device according to an embodiment of the disclosure. The electronic device will be described with reference to FIGS. 2 and 3 together.

Referring to FIG. 2, the electronic device 100 includes a communication interface 110, a microphone 120, a camera 130, a sensor 140, a display 150, and a processor 160.

The communication interface 110 communicates with an external device in a UWB communication manner. For example, the communication interface 110 may include a UWB communication module. The communication interface 110 may transmit a message requesting data to the external device using the UWB communication module and receive a response message from the external device. Also, since UWB is directional, the communication interface 110 may receive direction or angle information of an external device. Also, the communication interface 110 may receive identification information from the external device. For example, the identification information may include a subject's name, phone number, subject's face image, and unique information of the external device. Also, the communication interface 110 may receive information on a peripheral device connected to the external device. As an embodiment, a face image of the subject may be extracted by the external device using an image stored in the external device or a connected SNS. The processor 160 may calculate a distance between the electronic device 100 and the external device based on a transmission/reception time between transmission of a request message and reception of a response message. That is, the processor 160 may acquire ranging information based on the transmission/reception time from a transmission time of a response request signal to a reception time of a response signal.

Also, the communication interface 110 may receive an audio signal from the external device when the external device is located farther than a predetermined distance (remote distance). Meanwhile, the communication interface 110 may include a module capable of performing communication in a method other than UWB, such as LTE, Wi-Fi, and Bluetooth. Accordingly, the communication interface 110 may be connected to the external device through a communication method, such as UWB, LTE, Wi-Fi or Bluetooth, and receive an audio signal according to the connected communication method. Also, the communication interface 110 may include a GPS module. The communication interface 110 may receive location information through a GPS module. The received location information may be considered together when the processor 160 determines a location and direction of the electronic device 100. The communication interface 120 communicates with an external device and may be referred to as a communication unit, a communication module, a transceiver, or the like.

The microphone 120 may receive an audio signal. As an example, the electronic device 100 may include a plurality of microphones. The plurality of microphones may be disposed in an upper area, a lower area, a front area, a rear area, a camera arrangement area, or the like of the electronic device 100. At least one of the plurality of microphones may be a directional microphone. The microphone 120 may acquire an audio signal from a subject located within a predetermined distance under the control of the processor 160.

The camera 130 captures an image including a subject. As an example, the electronic device 100 may include a plurality of cameras. At least one of the plurality of cameras may be a depth camera.

The sensor 140 detects a direction in which the camera 130 faces. For example, the camera 130 may be fixed to be disposed on the electronic device 100. Accordingly, a direction in which the camera 130 is directed may coincide with a direction in which the electronic device 100 is directed. Also, the direction in which the camera 130 faces may be an image capture direction. Accordingly, the processor 160 may acquire image capture direction information according to direction information detected by the sensor 140. For example, the sensor 140 may include an acceleration sensor, a gravity sensor, a gyro sensor, a geomagnetic sensor, a direction sensor, a motion recognition sensor, a proximity sensor, and the like.

The display 150 displays a captured image. Also, the display 150 may display a UI including a level of the acquired audio signal together with the captured image. For example, the display 150 may display the level of the audio signal in a UI in the form of a level meter. Also, the UI including the level of the audio signal may include augmented reality (AR). The display 150 may be implemented as a liquid crystal display (LCD), an organic light emitting diode (OLED), a flexible display, or a touch screen.

The processor 160 may control each component of the electronic device 100. For example, the processor 160 may control the communication interface 110 to transmit/receive data with an external device and control the sensor 140 to detect an image capture direction. As described above, the processor 160 may acquire ranging information between the electronic device 100 and an external device based on a transmission/reception time between transmission of a request message and reception of a response message. Also, the processor 160 may acquire image capture direction information based on a direction of the camera 130 sensed by the sensor. The processor 160 may improve accuracy of the acquired image capture direction information by acquiring image capture direction information using the received location information. The processor 160 identifies an external device for acquiring an audio signal of a subject based on the acquired image capture direction information, ranging information, and angle information. When the external device is located closer than a predetermined distance, the processor 160 controls the microphone 120 to receive an audio signal from the subject. When the external device is located farther than the predetermined distance, the processor 160 controls the communication interface 110 to receive an audio signal of a subject input to the external device.

The processor 160 may analyze the captured image. The processor 160 may determine a subject in the captured image, and may determine a direction, an angle, and the like of the subject. When the electronic device 100 includes a depth camera, the processor 160 may determine a distance to the subject. The processor 160 may identify the subject and a location of the subject based on the direction information, angle information, and ranging information of the external device determined from the analyzed image, together with the identification information received through the communication interface 110.

The processor 160 may control the camera 130 (e.g., a variable shutter, etc.) and set a corresponding control interface based on information acquired by analyzing the captured image and information received from an external device through a UWB communication method. Meanwhile, the processor 160 may transmit the captured image to a specific external device. The processor 160 may process the acquired audio signal and determine a peak level of the audio signal. An embodiment in which the processor 160 processes the audio signal will be described in detail below.

The processor 160 controls the display 150 to display the captured image. The processor 160 controls the display 150 to display a UI (e.g., AR) indicating a level (magnitude) of the acquired audio signal along with the displayed image. The processor 160 may identify the subject based on the information acquired by analyzing the captured image and identify an utterance location of the acquired audio signal. The processor 160 may determine an audio signal corresponding to the subject. The processor 160 may map the identified subject to a corresponding audio signal. Also, the processor 160 may control the display 150 to display the level of the audio signal mapped to an area adjacent to the subject of the captured image.

Accordingly, the electronic device 100 of the disclosure may select and track only a specific subject, while recording, when imaging a plurality of subjects based on the UWB distance and angle information.

The electronic device 100 may further include other components than the components described above. Referring to FIG. 3, the electronic device 100 may further include an input interface 170, a speaker 180, and a memory 190.

The input interface 170 may receive a control command from a user. For example, the input interface 170 may be implemented as a key pad or a touch pad. The input interface 170 performs a function of receiving a command from the user, and may also be referred to as an input unit or an input module.

The input interface 170 may also be implemented as the camera 130, the microphone 120, the sensor 140, or the display 150 in addition to the keypad and touchpad described above. For example, when the input interface 170 is implemented as the camera 130, the electronic device 100 may image a user's facial expression or motion. The processor 160 may recognize a control command based on an imaged facial expression or motion. When the input interface 170 is implemented as the microphone 120, the electronic device 100 may receive a user's voice. The processor 160 may recognize a control command based on the input voice. When the input interface 170 is implemented as the sensor 140, the sensor 140 may receive an input of a user's motion or the like. The processor 160 may recognize a control command based on the input signal. Also, when the display 150 is implemented as a touch screen, the electronic device 100 may receive a control command through the touch screen.

The speaker 180 may output the acquired audio signal. In addition, the speaker 180 may output a user's input command, state-related information or operation-related information of the electronic device 100 by voice or notification sound.

The memory 190 may store data for performing functions of the electronic device 100, and may store programs and commands operated in the electronic device 100. The memory 190 may store acquired audio signals or captured images. Also, the memory 190 may store identification information. For example, the memory 190 may be implemented in a type, such as ROM, RAM, HDD, SSD, or memory card.

The electronic device 100 may include all of the components described above, or may include some components. In addition, the electronic device 100 may further include other components that perform various functions in addition to the components described above.

Figure 4:
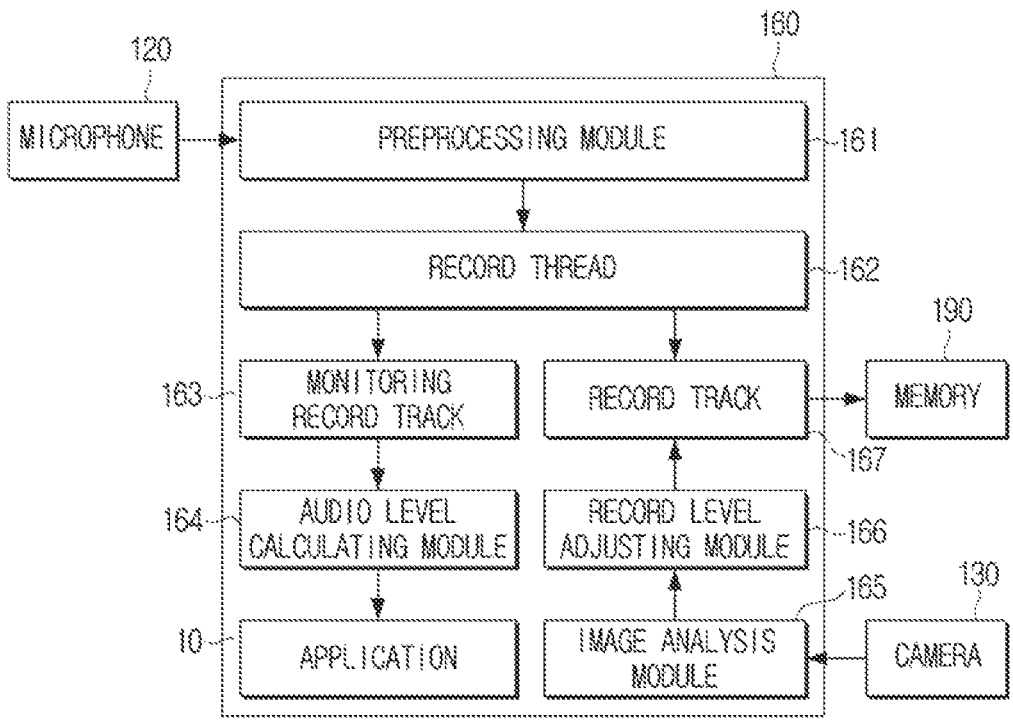
FIG. 4 is a block diagram illustrating architecture of a processor according to an embodiment of the disclosure.

FIG. 4 is a block diagram illustrating architecture of a processor according to an embodiment of the disclosure.

Referring to FIG. 4, the processor 160 may include a preprocessing module 161, a record thread 162, a monitoring record track 163, an audio level calculating module 164, an image analysis module 165, a record level adjusting module 166, and a record track 167. Also, the processor 160 may execute an application 10. The aforementioned module 160 may be implemented in hardware or software, and may be included in the processor 160 or stored in the memory 190. When the aforementioned module is stored in the memory 190, the processor 160 may load the module from the memory 190 when processing an audio signal.

The preprocessing module 161 may receive an audio signal from the microphone 120. Alternatively, the preprocessing module 161 may receive an audio signal from an external device through the communication interface 110. The preprocessing module 161 may process pulse code modulation (PCM) audio data received from an audio driver. The audio driver may be included in the preprocessing module 161 or may be implemented as a separate module between the microphone 120 and the preprocessing module 161. For example, the preprocessing module 161 may perform processing, such as noise suppressor and dynamic range control (DRC). In addition, the preprocessing module 161 may perform sensitivity adjustment when receiving a global record level adjustment event. When the sensitivity is high, an audio signal having the same magnitude may be amplified to a larger size. Since the sensitivity adjusted in the preprocessing module 161 is global, the sensitivity may affect a volume of n record tracks 167.

The record thread 162 may buffer the PCM data processed in the preprocessing module 161. The record thread 162 may synchronize audio properties between an operation of the audio driver and an operation of the record track. For example, the record thread 162 may perform a resampling operation for synchronization of sample rate properties and a reformatting operation for synchronization of audio format properties. Also, the record thread 162 may duplicate (or copy) single audio data to n record tracks 167. Since the audio data is duplicated to the n record tracks 167, a restriction that only one application may occupy a resource of one audio signal may be overcome. That is, each of n applications may use a resource of one audio signal among the resources of the audio signals duplicated to then record tracks 167. Accordingly, in the disclosure, when one application occupies a resource of an audio signal, another application may use the resource of the audio signal, thereby solving the problem that multi-recording cannot be performed.

The monitoring record track 163 may prepare the microphone 120 (or audio signal setting) in advance before recording starts and monitor a noise level around recording. Since the monitoring record track 163 sets up audio signal resources to be used by the record track 167 in advance, recording start time may be shortened. Therefore, the disclosure has an effect of starting recording without losing the recording start moment. In addition, the monitoring record track 163 may monitor the ambient noise level before recording starts and display the monitored noise level on the screen. Thus, the disclosure may help users set the record level high when recording in a noisy environment.

The audio level calculating module 164 may calculate a level of an input audio signal. The audio level calculating module 164 may separate a PCM channel from the input audio signal. For example, the audio level calculating module 164 may separate the received PCM audio data for each channel. The audio level calculating module 164 may calculate the level of audio data for each separated channel.

The image analysis module 165 may analyze a captured image input from the camera 130. The image analysis module 165 may determine a subject in the captured image, and may determine a direction, an angle, and the like of the subject. When the electronic device 100 includes a depth camera, the image analysis module 165 may determine a distance to the subject. Also, the image analysis module 165 may determine the presence of an object that causes noise.

The record level adjusting module 166 may generate an event for adjusting a recording volume. The recording volume adjustment event may include a global recording adjustment event and a local recording adjustment event. The global recording adjustment event may be delivered to the preprocessing module 161, and the preprocessing module 161 may adjust the sensitivity, and the local recording adjustment event may be delivered to the record track 167, and the record track 167 may adjust the recording volume. For example, recording volume adjustment may include two methods: automatic or manual. In the case of automatic recording volume adjustment, the record level adjusting module 166 may automatically adjust the recording volume based on scene analysis data received from the camera 130 and ambient noise received from the monitoring record track 163.

The record track 167 may deliver PCM audio data provided from the record thread 162 to an encoder. The encoder may encode the delivered PCM audio data and store the encoded data in the memory 190. In addition, when a local record level adjustment event is delivered, the record track 167 may amplify or attenuate PCM audio data by the record level. Since the record level adjusted in the record track 167 is local, the record level may affect only the recording volume of the application (App) corresponding to the corresponding record track.

The processor may also include a visualization module. The PCM audio data may be classified as microphone mode or directional mode and separated into channels. The pre-processing module 161 may determine a visualization mode and classify the extracted PCM audio data for each channel according to the corresponding mode. The visualization module may store each PCM channel classified according to the mode or visualize each PCM channel to display the same on the display.

The record thread 162 and the record track 167 are described in detail below.

Figure 5:
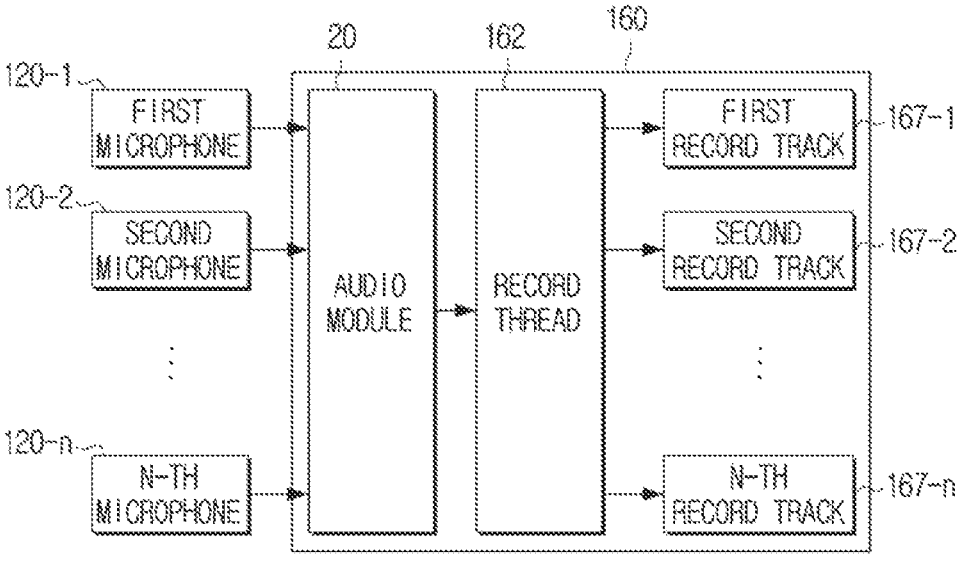
FIG. 5 is a block diagram illustrating a process of controlling a volume of a multi-microphone according to an embodiment of the disclosure.
Figure 6:
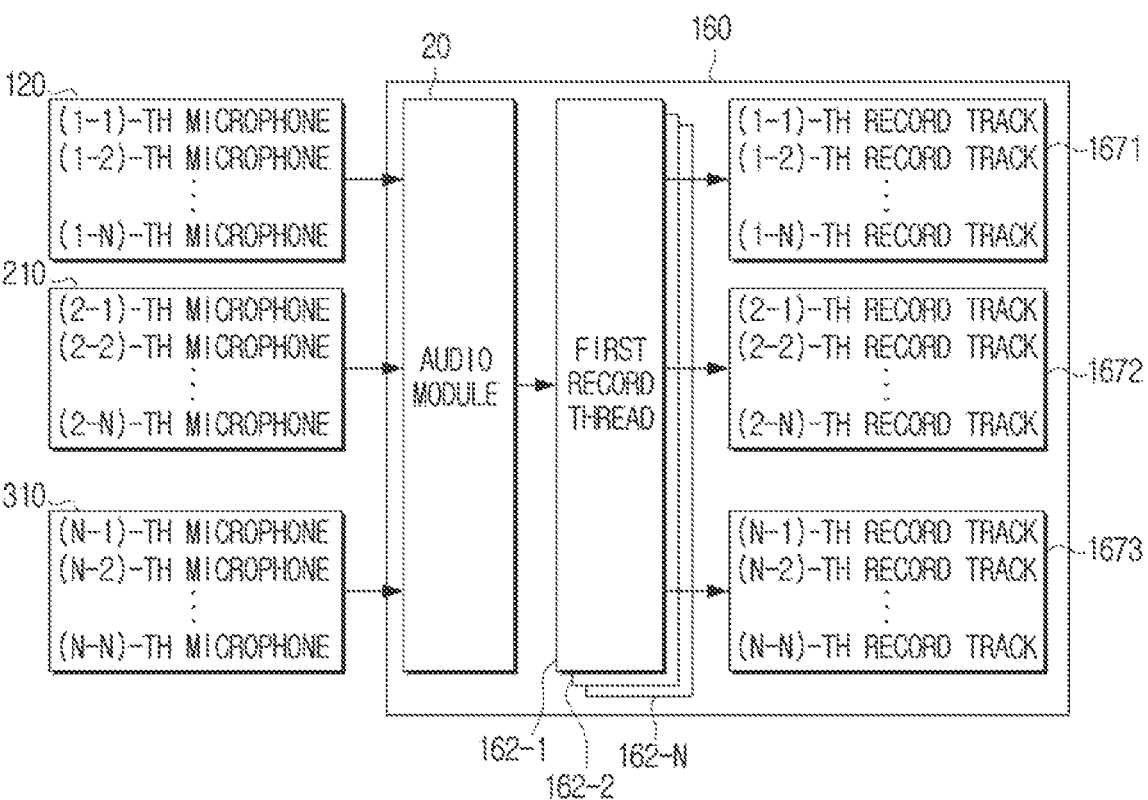
FIG. 6 is a block diagram illustrating a process of controlling a volume of an audio signal of a plurality of devices according to an embodiment of the disclosure.

FIG. 5 is a block diagram illustrating a process of controlling a volume of a multi-microphone according to an embodiment of the disclosure, and FIG. 6 is a block diagram illustrating a process of controlling a volume of an audio signal of a plurality of devices according to an embodiment of the disclosure. Descriptions are given with reference to FIGS. 5 and 6 together.

Referring to FIG. 5, the electronic device may include a plurality of microphones including a first microphone 120-1, a second microphone 120-2, and an n-th microphone 120-n. Also, the processor 160 may include an audio module 20 and a record thread 162, and may include a plurality of record tracks including a first record track 167-1, a second record track 167-2, and an n-th record track 167-n.

For example, voice of a single user may be input through the plurality of microphones 120-1, 120-2, and 120-n of the electronic device. One input audio signal may be delivered to the audio module 20. The audio module 20 may include an audio driver to convert the input audio signal into PCM audio data. The processor 160 may generate the record thread 162 corresponding to the converted PCM audio data. Although the input audio signal is input through the plurality of microphones 120-1, 120-2, and 120-n, the input audio signal is the same audio signal. Accordingly, in the case of FIG. 5, one record thread 162 may be generated. The processor 160 may generate one record thread 162 as a plurality of record tracks 167-1, 167-2, and 167-n. Each record track may be used in each application. Accordingly, when n record tracks are generated, n applications may use audio signal resource.

Meanwhile, as described above, when a distance between the electronic device and an external device is greater than or equal to a predetermined distance, the electronic device may acquire an audio signal from the external device. For example, the external device may receive an audio signal of an adjacent user (subject) through a microphone and transmit the received audio signal to the electronic device through a communication interface. As an embodiment, as shown in FIG. 6, the electronic device may acquire an audio signal of a first user through a plurality of microphones 120 included in the electronic device, acquire an audio signal of a second user through a microphone 210 included in a second electronic device, and acquire an audio signal of a third user through a microphone 310 included in an N-th electronic device. The acquired audio signal of the user may be delivered to the audio module 20. The audio module 20 may include an audio driver and convert each input audio signal into PCM audio data. The processor 160 may generate a plurality of record threads 162-1, 162-2, and 162-N corresponding to the converted PCM audio data. Each of the record threads 162-1, 162-2, and 162-N may correspond to an audio signal input through the microphones 120, 210, and 310 of each device. The processor 160 may generate a plurality of record tracks 1671, 1672, and 1673 for the record threads 162-1, 162-2, and 162-N, respectively.

Accordingly, the electronic device of the disclosure may support multi-recording.

Figure 7:
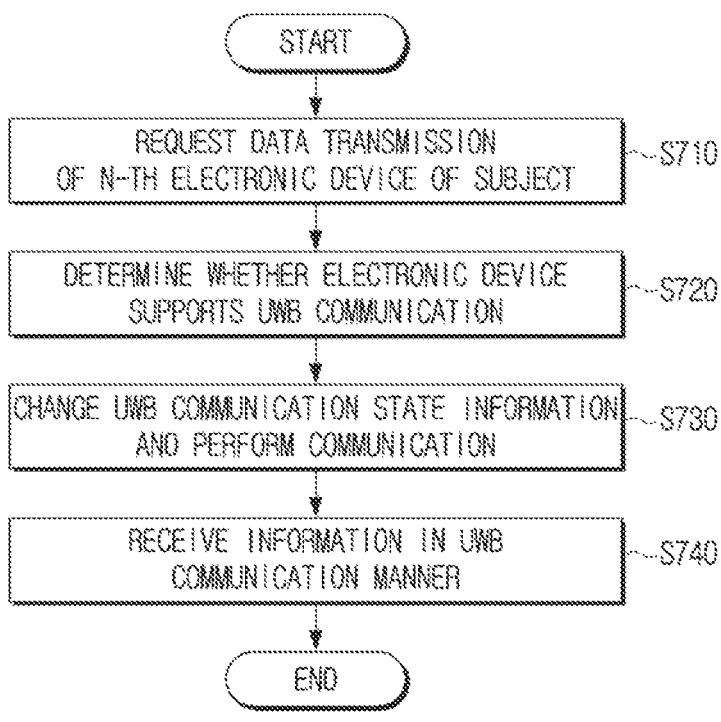
FIG. 7 is a flowchart illustrating a process of receiving information of an electronic device of a subject according to an embodiment of the disclosure.
Figure 8:
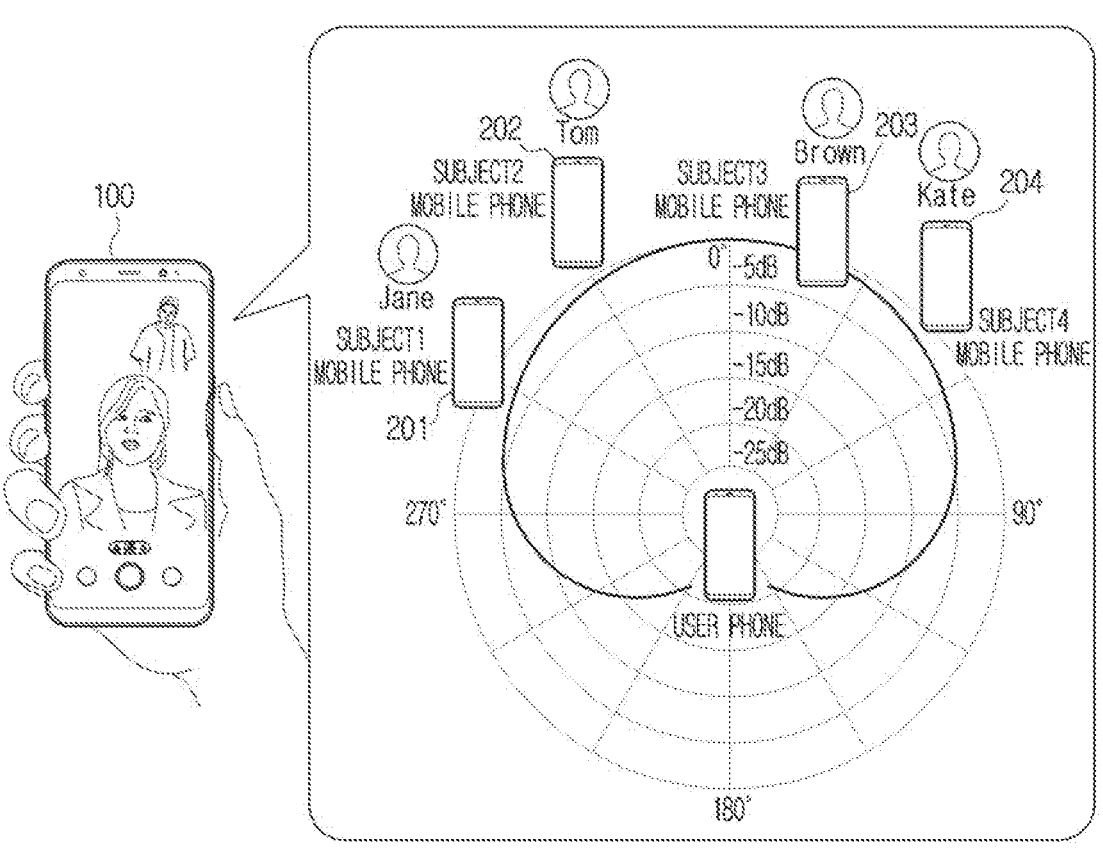
FIG. 8 is a diagram illustrating receiving information of an external device in a UWB communication manner according to an embodiment of the disclosure.
Figure 9:
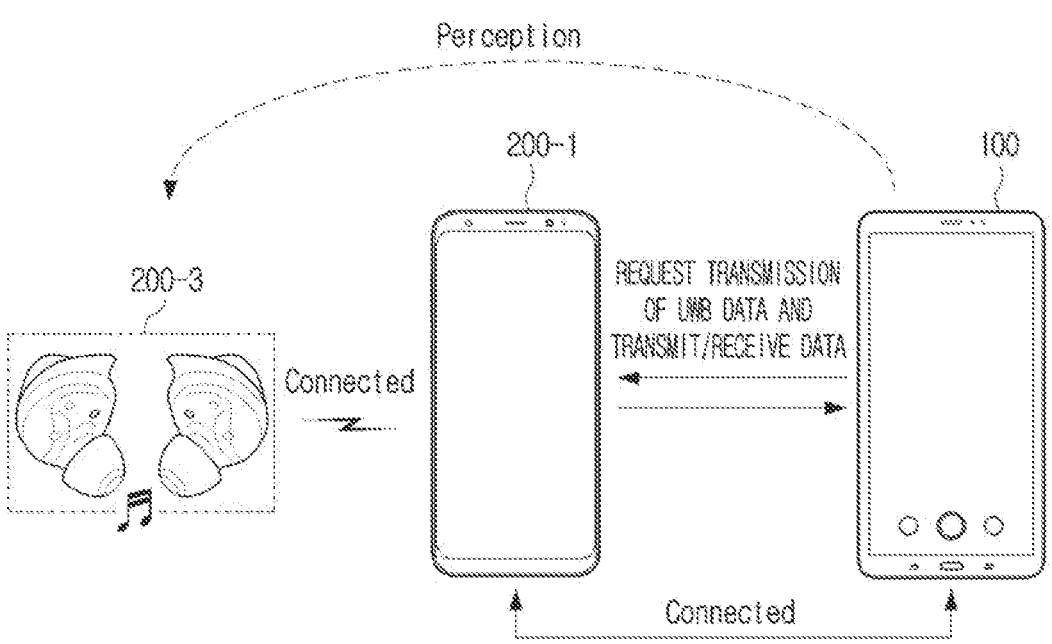
FIG. 9 is a diagram illustrating a process of acquiring an audio signal of a distant subject according to an embodiment of the disclosure.

FIG. 7 is a flowchart illustrating a process of receiving information of an electronic device of a subject according to an embodiment of the disclosure, FIG. 8 is a diagram illustrating an embodiment of receiving information of an external device in a UWB communication manner, and FIG. 9 is a diagram illustrating a process of acquiring an audio signal of a distant subject according to an embodiment of the disclosure. Descriptions are given with reference to FIGS. 7 to 9 together.

Referring to FIG. 7, the electronic device may request data transmission from the external device (S710) and determine whether the external device supports UWB communication (S720). As an example, the electronic device may identify the external device using UWB. The electronic device may determine ranging information and angle information on the external device through a UWB signal. The electronic device may request data transmission from one or more external devices and determine whether the external device supports UWB communication. The external device may be a device located in an area adjacent to the subject. Alternatively, the external device may be a device owned (or possessed) by the subject.

The electronic device may change UWB communication state information and communicate with the external device (S730). The electronic device may receive information in a UWB communication manner (S740). The electronic device may change communication state information to UWB and start designated communication with the external device. An electronic device may receive identification information from the external device through a UWB communication method. For example, the identification information may include subject information, and may include the subject's name, phone number, subject's face image, and unique information of an external device. Also, the communication interface 110 may receive information on a peripheral device connected to the external device. The electronic device may transmit a request message to the external device and receive a response message. The electronic device may measure the message transmission/reception time and determine a distance to the external device based on the measured time. Since UWB is directional, the electronic device may receive location-related information, such as direction, ranging information, and angle information of the external device, and may identify the external device based on the received location-related information. The electronic device may select the identified external device from among a plurality of external devices. That is, the electronic device may receive an audio signal corresponding to the selected external nal device.

As an embodiment, as shown in FIG. 8, around the user's electronic device 100 may be Jane's smartphone 201, Tom's smartphone 202, Brown's smartphone 203, and Kate's smartphone 204. The electronic device may identify locations and users of Jane's smartphone 201, Tom's smartphone 202, Brown's smartphone 203, and Kate's smartphone 204 through UWB communication. When the electronic device 100 selects Brown's smartphone 203, it may receive Brown's audio signal from Brown's smartphone 203.

When the distance to the subject (or external device) is less than a predetermined distance, the electronic device may receive an audio signal through the microphone. When the distance to the subject (or the external device) is greater than or equal to the predetermined distance, the electronic device may receive an audio signal through the microphone of the external device. As an embodiment, as shown in FIG.

9, the electronic device 100 may request transmission of data and transmit/receive messages with the external device 200-1 of a subject in a UWB communication manner. When the subject uses the wireless earphone 200-3, the wireless earphone 200-3 may be communicatively connected to the external device 200-1 of the subject. The external device 200-1 of the subject may transmit information on the wireless earphone 200-3 to the electronic device 100. The electronic device 100 may recognize the presence of the wireless earphone 200-3. Also, the electronic device 100 may receive an audio signal of a subject through the wireless earphone 200-3 and the external device 200-1. Alternatively, the electronic device 100 may directly receive an audio signal of the subject through the wireless earphone 200-3.

The electronic device 100 may monitor environmental noise in a monitoring record track for the received audio signal.

Figure 10:
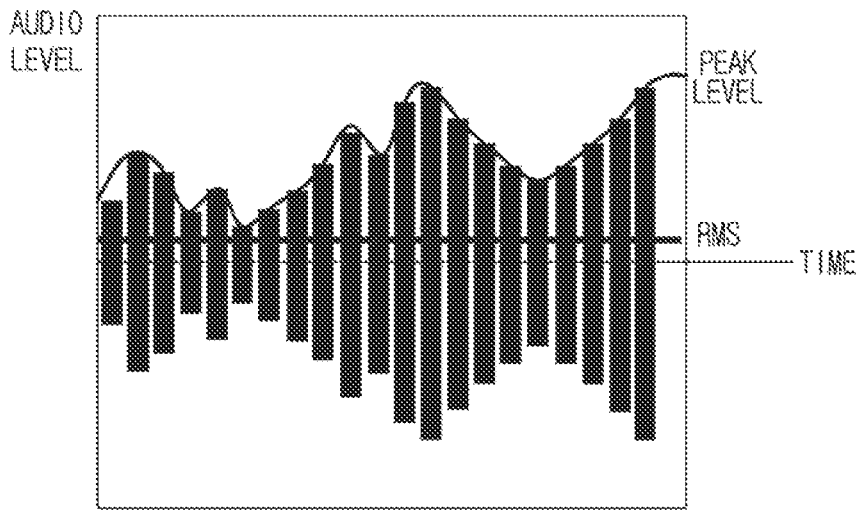
FIG. 10 is a diagram illustrating levels of monitoring tracks according to an embodiment of the disclosure.

FIG. 10 is a diagram illustrating levels of monitoring tracks according to an embodiment of the disclosure.

The electronic device may display a level of environmental noise in real time before the user starts sound recording or video recording. The electronic device may provide surrounding environment information to the user during sound recording or video recording by providing a visualized volume level.

The electronic device may generate a monitoring track before starting sound recording or video recording. The monitoring track may analyze a peak level of the audio signal in units of frames in the preprocessing module. Also, the electronic device may display the analyzed peak level in real time. A method of analyzing a magnitude of the audio signal may include a root mean square (RMS) analysis method and a peak level analysis method. As shown in FIG. 10, the peak level refers to a maximum amplitude in real time, and the RMS refers to an average amplitude of a section. The RMS may acquire an average audio level value of a section, but it is not suitable for measuring a real-time audio level. Meanwhile, since the peak level calculates audio energy of a short moment, it is suitable for expressing real-time audio energy. Therefore, the electronic device of the disclosure monitors environmental noise and displays the peak level energy of noise in real time.

Figure 11:
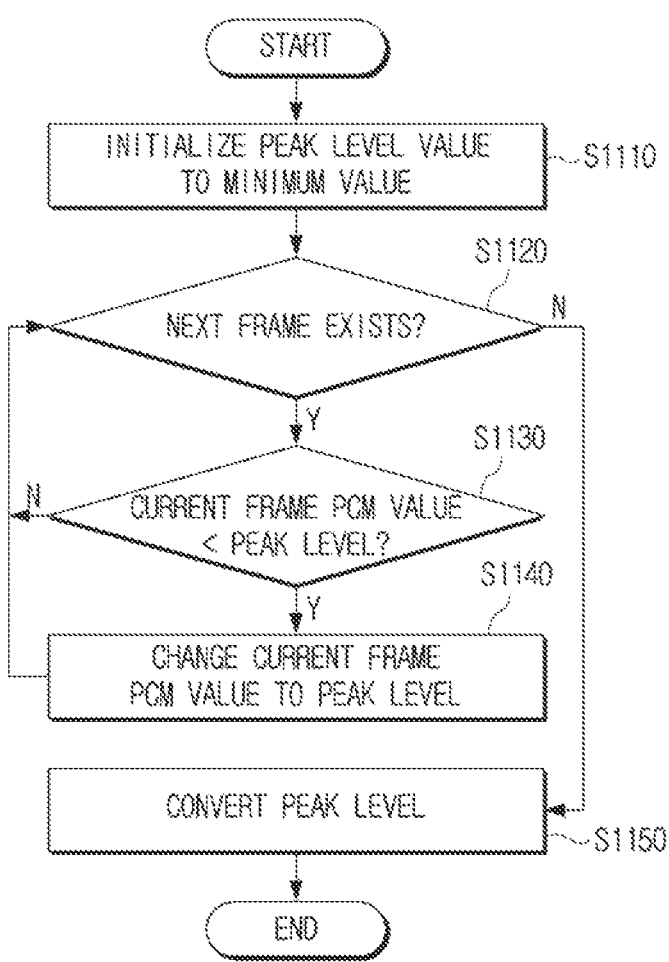
FIG. 11 is a flowchart illustrating a process of measuring a peak level of an audio signal according to an embodiment of the disclosure.

FIG. 11 is a flowchart illustrating a process of measuring a peak level of an audio signal according to an embodiment of the disclosure. The peak level may refer to a maximum value during a frame period.

Referring to FIG. 11, the electronic device 100 may initialize the peak level value to a minimum value (S1110). The electronic device may determine whether a next frame exists (S1120). If there is a next frame, the electronic device may determine whether a PCM value of the current frame is less than the peak level (S1130).

If the PCM value of the current frame is greater than the peak level, the electronic device may determine whether there is a next frame again (S1120). If the PCM value of the current frame is less than the peak level, the electronic device may change the PCM value of the current frame to the peak level (S1140) and determine whether there is a next frame again (S1120).

If the next frame does not exist, the electronic device may convert the peak level (S1150). Also, the electronic device may visualize and display the peak level.

When a recording function is already in use, the electronic device may omit an existing recording setting process.

Figure 12:
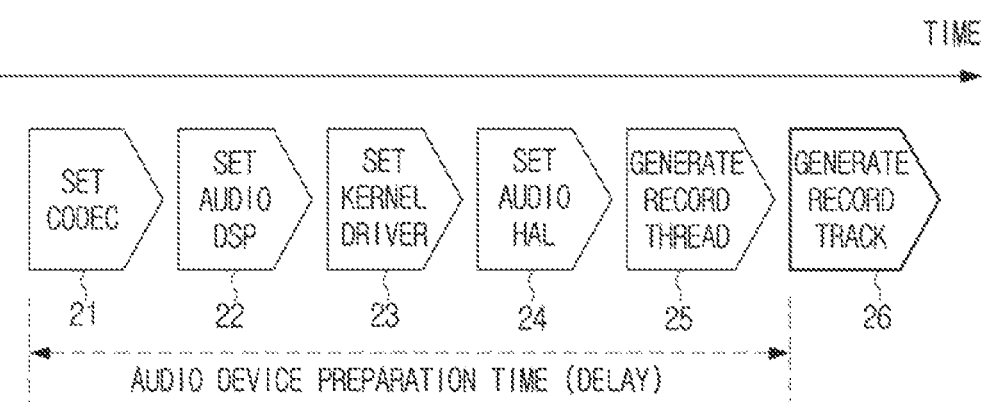
FIG. 12 is a diagram illustrating a recording process according to an embodiment of the disclosure.

FIG. 12 is a diagram illustrating a recording process according to an embodiment.

When recording starts, the electronic device needs to set various modules to process the audio signal. For example, the electronic device needs to set (initialize) a codec, audio DSP, kernel driver, audio hardware abstract layer (HAL), etc. and generate a record thread 25 and a record track 26. That is, the initial recording setting process may include at least one of a codec setting process 21, an audio DSP setting process 22, a kernel driver setting process 23, and an audio HAL setting process 24. Accordingly, the electronic device may spend time for setting an audio signal processing process, and a delay of several ms to several tens of ms may occur after receiving a sound recording or video recording command.

If the electronic device already uses the record function, the existing record thread may be connected and the same data may be copied. That is, when the record thread is active, the electronic device may omit the initial recording setting process and generate a plurality of record tracks for processing the acquired audio signal. Also, the electronic device may form multiple record threads by connecting a plurality of record tracks related to the audio signal to the active record thread. Therefore, the electronic device of the disclosure may reduce the sound recording and video recording start time to the user empirically by streamlining a preparation time of the kernel and audio signal processing.

Figure 13:
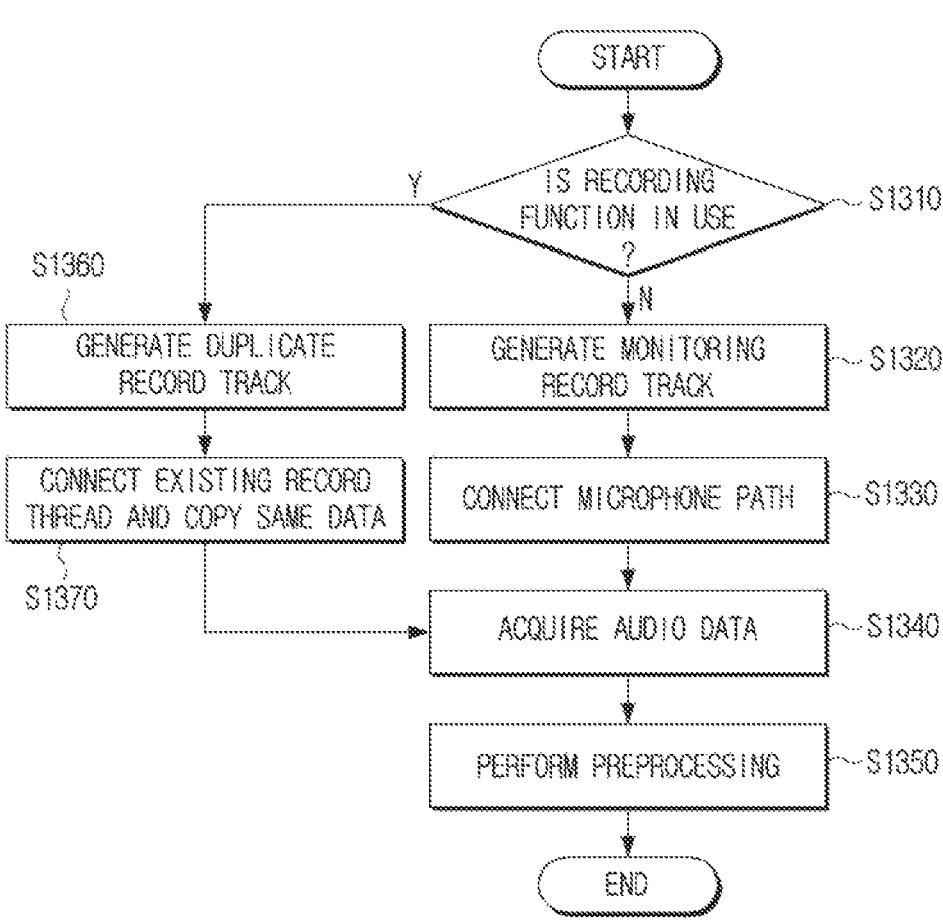
FIG. 13 is a flowchart illustrating a process of acquiring an audio signal according to an embodiment of the disclosure.

FIG. 13 is a flowchart illustrating a process of acquiring an audio signal according to an embodiment of the disclosure.

Referring to FIG. 13, the electronic device may determine whether to use a recording function (S1310). For example, the electronic device may determine whether the record thread is in an active state or in an inactive state. If the record thread is in an inactive state, the electronic device may generate a monitoring record track (S1320). For example, if there is no recording in use, the electronic device may newly generate an environmental noise monitoring record track.

The electronic device may connect a microphone path (S1330). For example, when a record track to be monitored is newly generated, the electronic device may control a movement path between a microphone module and an audio driver to acquire an audio signal from a specific microphone device. The electronic device may acquire audio data (S1340). The electronic device may perform a record thread loop microphone data acquisition operation. For example, the electronic device may acquire an input signal of the microphone in real time by repeatedly performing a record thread loop on the input signal of the connected microphone device at regular time intervals.

The electronic device may perform preprocessing on the acquired audio data (S1350). For example, the electronic device may process received PCM audio data. As an embodiment, the electronic device may perform signal processing, such as noise attenuation, filtering, and amplification, on PCM audio data. Also, the electronic device may extract directional audio data using a signal difference (beamforming) between two or more microphone data.

If the record thread is in an active state, the electronic device may generate duplicate record tracks (S1360). For example, if n applications each request a recording operation, the electronic device may omit the microphone path connection process (S1330) (or the initial recording setting process) and reuse the previously established microphone path. Accordingly, the electronic device may generate n duplicated record tracks while reducing setup time.

The electronic device may connect the existing record thread and copy the same data (S1370). For example, the electronic device may connect the generated duplicate record track to a sub-track of a previously generated record thread loop. In addition, when acquiring microphone data (audio data), the electronic device may copy and transmit the same data to each of the connected sub-tracks.

Figure 14:
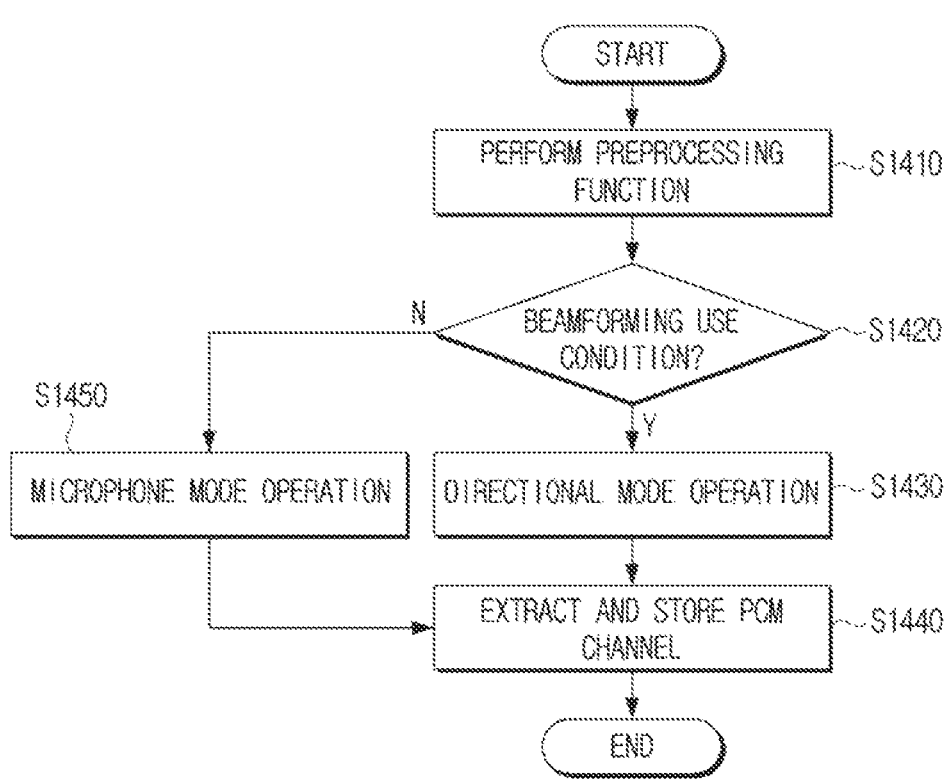
FIG. 14 is a flowchart illustrating a process of analyzing an acquired audio signal according to an embodiment of the disclosure.

FIG. 14 is a flowchart illustrating a process of analyzing an acquired audio signal according to an embodiment of the disclosure.

The electronic device may analyze the received audio, extract and store a channel. For example, during a recording operation, the electronic device may classify audio signals input from an N-th microphone according to directionality, object, or microphone device, and measure loudness of each sound.

Referring to FIG. 14, the electronic device may perform a preprocessing function (S1410). For example, the electronic device may process PCM audio data received from the audio driver in a preprocessing module.

The electronic device may determine a beamforming use condition (S1420). For example, the electronic device may determine whether the acquired PCM data satisfies the beamforming use condition. At least three physically fixed microphones are required to satisfy the beamforming use condition. The electronic device may check whether there are three or more microphone data in the received PCM data.

When the beamforming use condition is satisfied, the electronic device may perform a directional mode operation (S1430). For example, the electronic device may extract data for each direction (e.g., eight directions) by applying beamforming to three or more microphone signals.

If the beamforming use condition is not satisfied, the electronic device may perform a microphone mode operation (S1450). For example, the electronic device may separate each channel of the acquired PCM data to a first microphone data, a second microphone data, . . . , n-th microphone data. In addition, the electronic device may receive first microphone data, second microphone data, . . . , n-th microphone data of the N-th external device from the N-th external device and separate each microphone data. The electronic device may extract and store a PCM channel (S1440).

FIG. 15 is a diagram illustrating channels of an audio signal according to an embodiment.

As shown in FIG. 15, the separated audio signals may be stored for each directional channel or microphone channel.

For example, when the acquired audio signal satisfies the beamforming condition, the electronic device may separate and store the acquired audio signal into a plurality of directional channels based on directionality. Alternatively, when the acquired audio signal does not satisfy the beamforming condition, the electronic device may separate and store the acquired audio signal into a plurality of microphone channels based on the number of microphones.

Figure 16:
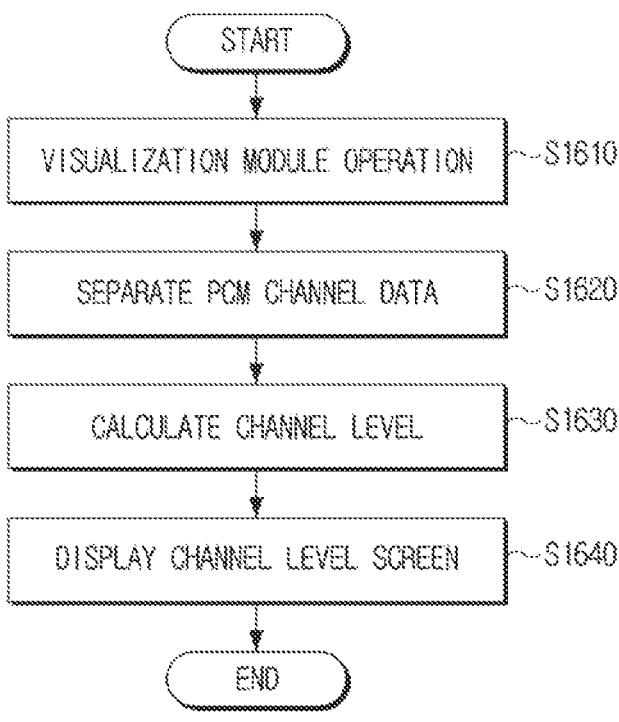
FIG. 16 is a flowchart illustrating a process of visualizing a level of an audio signal according to an embodiment of the disclosure.

FIG. 16 is a flowchart illustrating a process of visualizing a level of an audio signal according to an embodiment of the disclosure.

The electronic device may visualize and display a level of an audio signal. For example, the electronic device may determine the visualization mode by classifying the audio signal according to a directional mode or a microphone mode. Also, the electronic device may classify and visualize the PCM data extracted according to the corresponding mode for each channel, and display the channels at the level of the audio signal.

Referring to FIG. 16, the electronic device may perform a visualization module operation (S1610). For example, the electronic device may use the acquired PCM channel data for a visualization module. The electronic device may separate PCM channel data (S1620). For example, the electronic device may separate the acquired PCM channel data according to each channel.

The electronic device may calculate a channel level (S1630). For example, the electronic device may calculate a level for each channel for the separated PCM data. The electronic device may display a channel level screen (S1640). For example, the electronic device may map an object included in an image with a level value of a directional channel or a microphone channel using level values of respective channels. In addition, the electronic device may display level values of the mapped object and the microphone channel.

Figure 17:
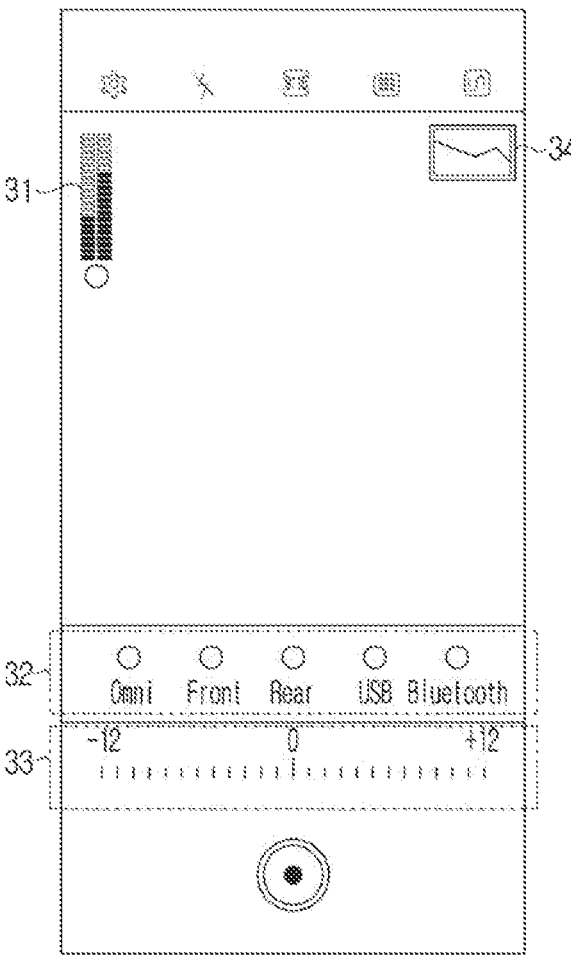
FIG. 17 is a diagram illustrating a user interface (UI) including a level of an audio signal according to an embodiment of the disclosure.

FIG. 17 is a diagram illustrating a UI including a level of an audio signal according to an embodiment of the disclosure.

Referring to FIG. 17, the electronic device may display an audio setting UI including an audio indicator 31 including an audio level value of a channel or an object, a microphone option type 32, a microphone sensitivity range 33, and a histogram 34.

An input level of audio setting may have a value of 0 dBFs to −48 dBFs. The dBFs does not have a reference value and represent a dynamic range of quantization. The level should be prefixed with a minus sign, and a maximum value may be zero. 0 dBFs refers to a state in which the level is maximized as data rather than voltage in internal DSP processing, and dBFs may be a peak value. A microphone of the electronic device may have directivity. Accordingly, the electronic device may display a UI of the option type 32 of the microphone displaying omni, front, and rear modes. The electronic device may include USB and Bluetooth menus displaying option types of external microphones. The range 33 of the microphone sensitivity may be −12 to +12 (total of 25 steps). The histogram 34 may display information on luminance of a captured image.

In addition, the electronic device may further display a zoom rocker, a ratio, and the like. The zoom locker may adjust zoom in/out at a constant speed.

Accordingly, the disclosure allows the user to recognize a microphone level by displaying the user microphone level. In addition, the disclosure may always monitor the microphone volume in various scenarios (e.g., recording, voice recognition, call, VLOG+USB, BT, terminal MIC).

The UI shown in FIG. 17 is an example, and the UI may be displayed in various forms depending on the shape of the electronic device, the size of the display, and the shape of the display. Alternatively, menus included in the UI may be displayed in various arrangements and shapes.

Figure 18:
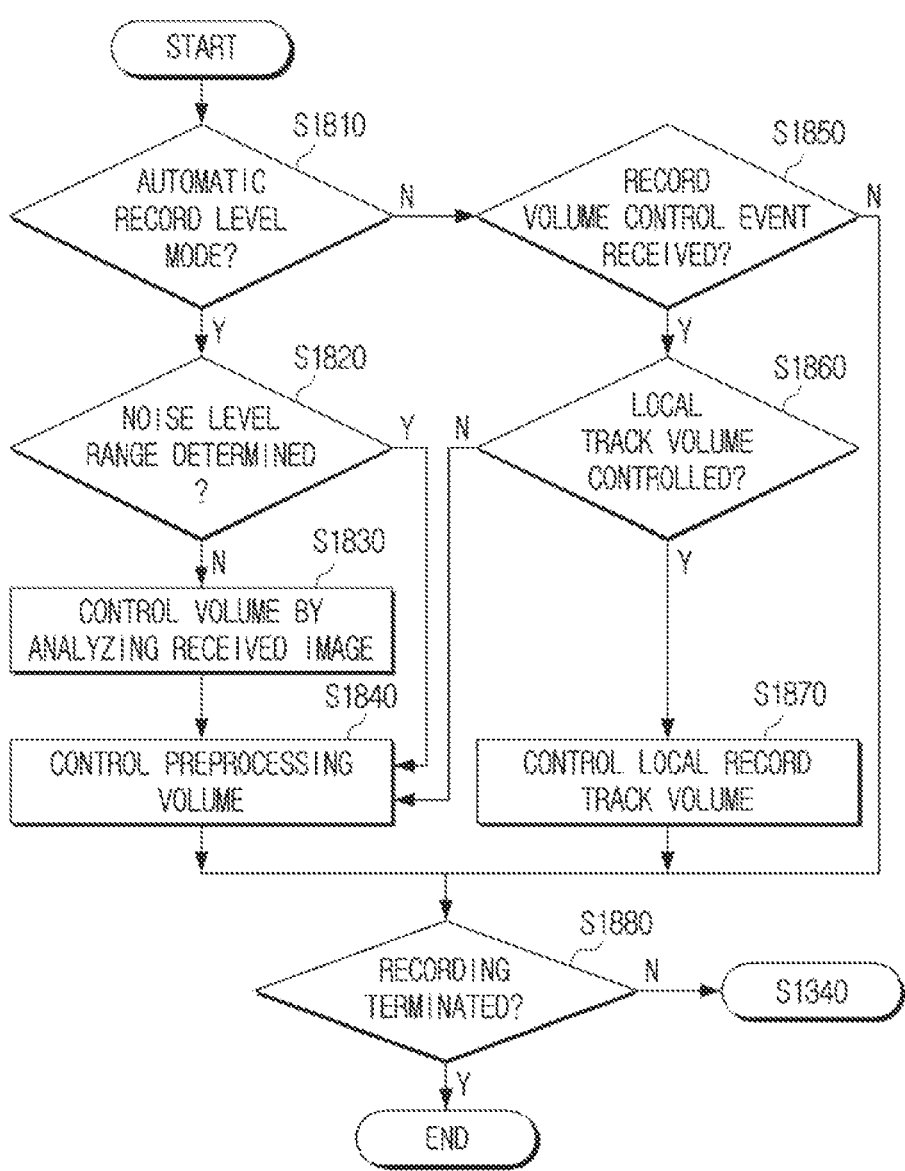
FIG. 18 is a flowchart illustrating a process of controlling a record level according to an embodiment of the disclosure.

FIG. 18 is a flowchart illustrating a process of controlling a record level according to an embodiment of the disclosure.

The electronic device may receive and process an event corresponding to visualized audio. For example, when sound recording or video recording starts, the electronic device may adjust the record level. For example, the electronic device may adjust an audio level in response to a nearby subject and adjust an audio level in response to a distant subject.

Referring to FIG. 18, the electronic device may determine whether an automatic record level mode is selected (S1810). For example, the electronic device may determine whether the user selects the automatic record level control mode.

When the automatic record level mode is selected, the electronic device may determine a noise level range (S1820). For example, the electronic device may acquire a volume level of ambient noise from a monitoring module. When the acquired volume level is within a noise level range specified by the user, the electronic device may perform automatic volume adjustment to avoid the noise level.

If the noise level range is not determined, the electronic device may control the volume by analyzing the acquired image (S1830). For example, in the case of video recording, the electronic device may analyze the acquired image to determine whether there is a factor causing environmental noise. If there is a noise-causing factor, a volume adjustment operation may be performed. Alternatively, the electronic device may determine whether an object of the image is a person, animal, or object and automatically control the volume of each factor.

The electronic device may perform a preprocessing volume adjustment operation (S1840). For example, when the noise level range is determined (S1820) or when the volume is controlled by analyzing the image (S1830), the electronic device may perform preprocessing volume adjustment. A volume value of the audio signal may exist for each channel, and the electronic device may control the volume value for each channel. That is, the electronic device may control the volume for each directional channel or each microphone channel.

When not in the automatic record level mode, the electronic device may determine whether a recording volume control event is received (S1850). For example, the electronic device may manually receive a volume control command. Manual control may be controlled by a volume adjustment window on a screen UI or by a hardware volume key.

When the recording volume control event is received, the electronic device may determine whether to control a local track volume (S1860). For example, the electronic device may control the volume of only a specific application alone and control the volume of only a specific record track according to a user's command.

When the local track volume control event (individual record track volume control event) is received, the electronic device may control the volume of the local record track (S1870). For example, the electronic device may control only the volume of audio data of a selected local record track.

The electronic device may determine whether to terminate the recording (S188). When the electronic device determines that the recording has not been terminated, the electronic device may acquire next audio data (S1340).

Accordingly, the electronic device of the disclosure may adjust the microphone volume while recording a video, and may adjust the microphone or record level based on ambient noise. Also, the electronic device may record at a uniform level even when an external microphone device is used. In addition, the electronic device may control the microphone volume according to each operating situation.

Figure 19:
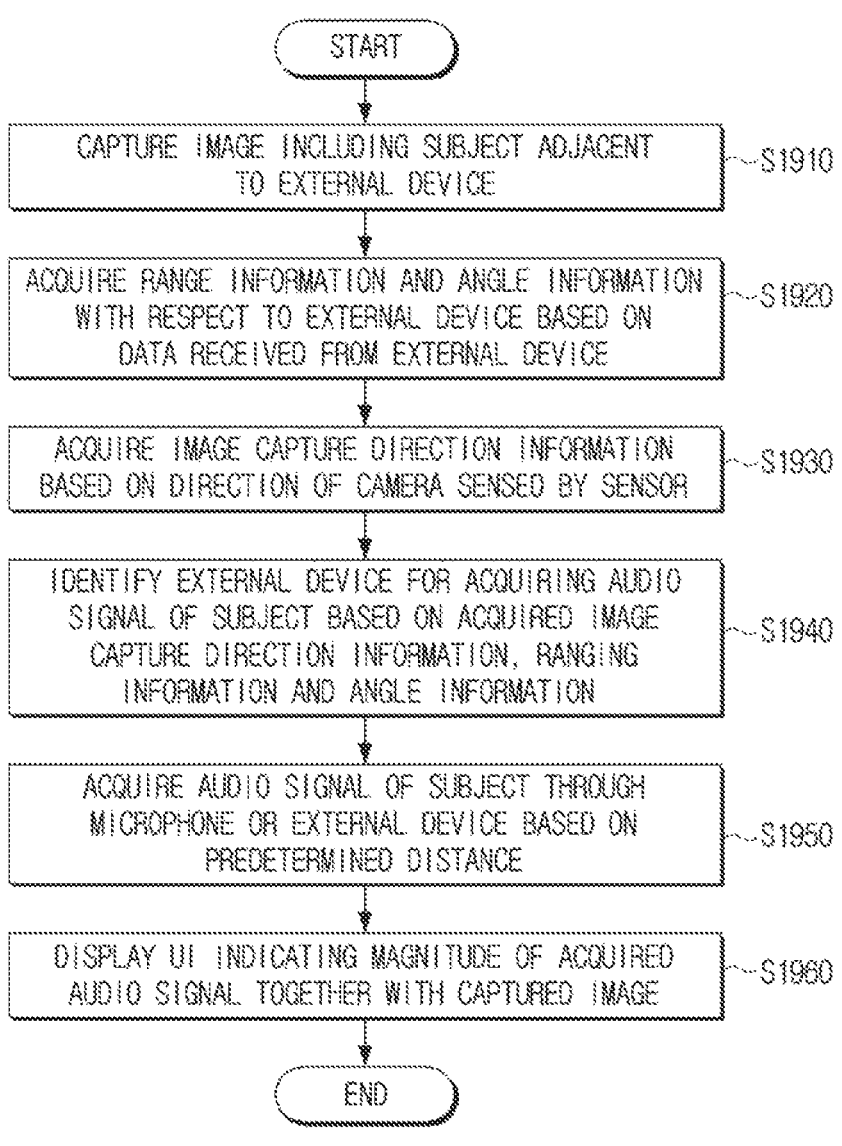
FIG. 19 is a flowchart illustrating a control method of an electronic device according to an embodiment of the disclosure.

FIG. 19 is a flowchart illustrating a control method of an electronic device according to an embodiment of the disclosure. The electronic device may communicate with an external device in a UWB manner.

Referring to FIG. 19, the electronic device captures an image including a subject adjacent to the external device (S1910). Then, the electronic device acquires ranging information and angle information with the external device based on the data received from the external device (S1920). For example, the electronic device may transmit a response request signal to the external device and receive a response signal. Also, the electronic device may acquire ranging information based on a transmission/reception time from a transmission time of the response request signal to a reception time of the response signal.

The electronic device acquires image capture direction information based on a direction of a camera sensed by the sensor (S1930). Meanwhile, the electronic device may receive satellite positioning information to increase accuracy of image capture direction information. The electronic device identifies an external device for acquiring an audio signal of a subject based on the acquired image capture direction information, ranging information, and angle information (S1940).

The electronic device acquires an audio signal of the subject through a microphone or an external device based on a predetermined distance (S1950). For example, the electronic device may acquire an audio signal of the subject through a microphone when a distance to the external device is less than a predetermined distance, and acquire an audio signal of the subject through the external device when the distance to the external device is greater than or equal to a predetermined distance.

The electronic device may identify whether the record thread is in an active state. When the record thread is in an inactive state, the electronic device may perform an initial recording setup process to store the acquired audio signal. For example, the initial recording setting process may include at least one of a codec setting process, an audio DSP setting process, a kernel driver setting process, and an audio hardware abstraction layer (HAL) setting process. The electronic device may generate a record thread and generate a plurality of record tracks for the generated record thread. Meanwhile, when the record thread is in an active state, the electronic device may omit the initial recording setting process and generate a plurality of record tracks for processing the acquired audio signal. Also, the electronic device may form multiple record threads by connecting the plurality of record tracks related to audio signals to the active record thread.

The electronic device may identify a peak level of an audio signal acquired using at least one record track related to the audio signal. For example, the monitoring track may identify a peak level of noise in the surrounding environment.

The electronic device displays a UI indicating a magnitude of the acquired audio signal together with the captured image (S1960). The electronic device may display the identified peak level as the magnitude of the acquired audio signal. Also, the electronic device may store the acquired audio signal. For example, the electronic device may store and display data related to the acquired audio signal based on a plurality of generated recorded tracks.

When the acquired audio signal satisfies the beamforming condition, the electronic device may separate and store the acquired audio signal into a plurality of channels based on directionality. If the acquired audio signal does not satisfy the beamforming condition, the electronic device may separate and store the acquired audio signal into a plurality of channels based on the number of microphones.

Meanwhile, the electronic device may control the volume of the audio signal for each record track or each channel.

Figure 20A:
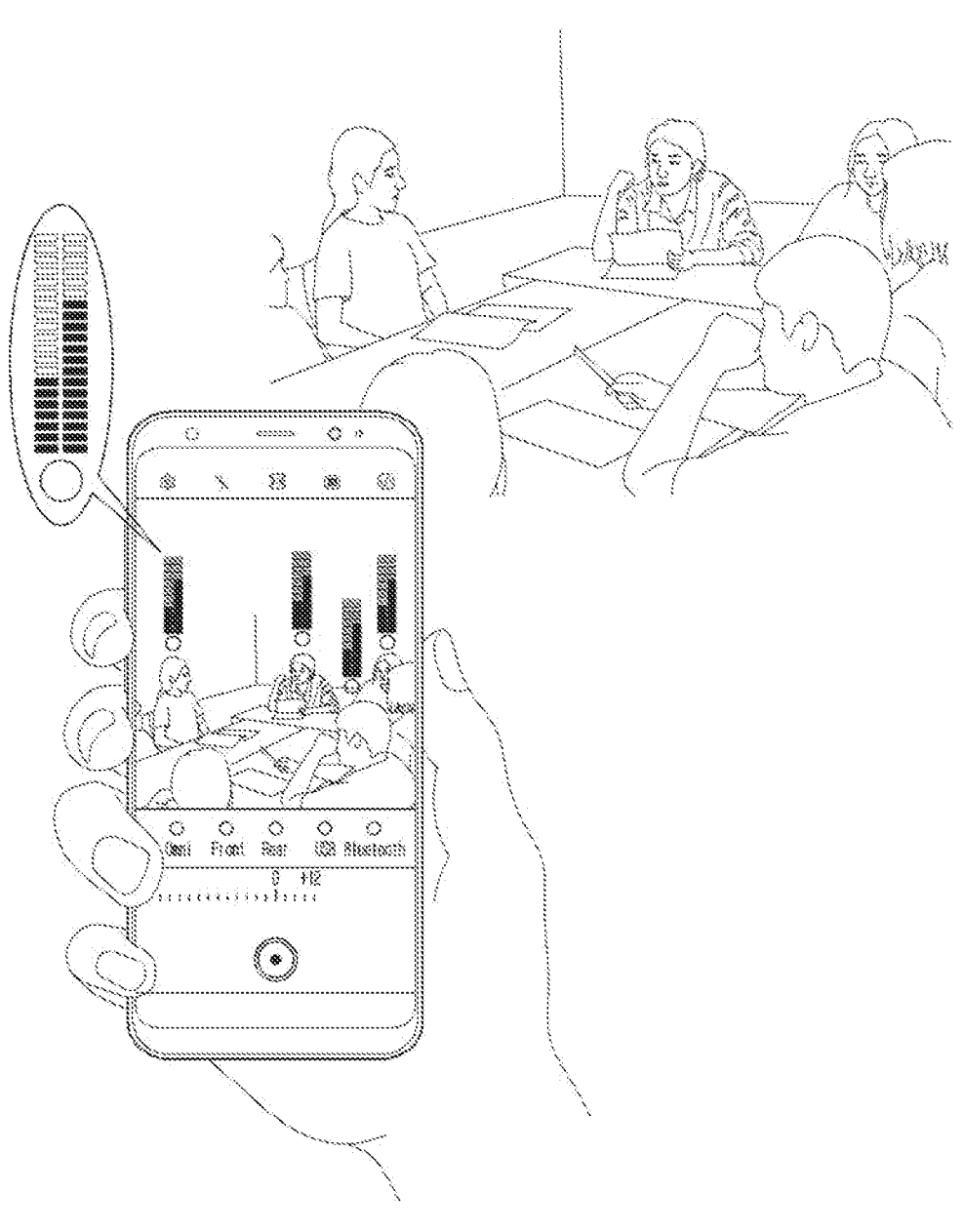
FIG. 20A is a diagram illustrating a UI displaying a volume of an audio signal of an object according to an embodiment of the disclosure.
Figure 20B:
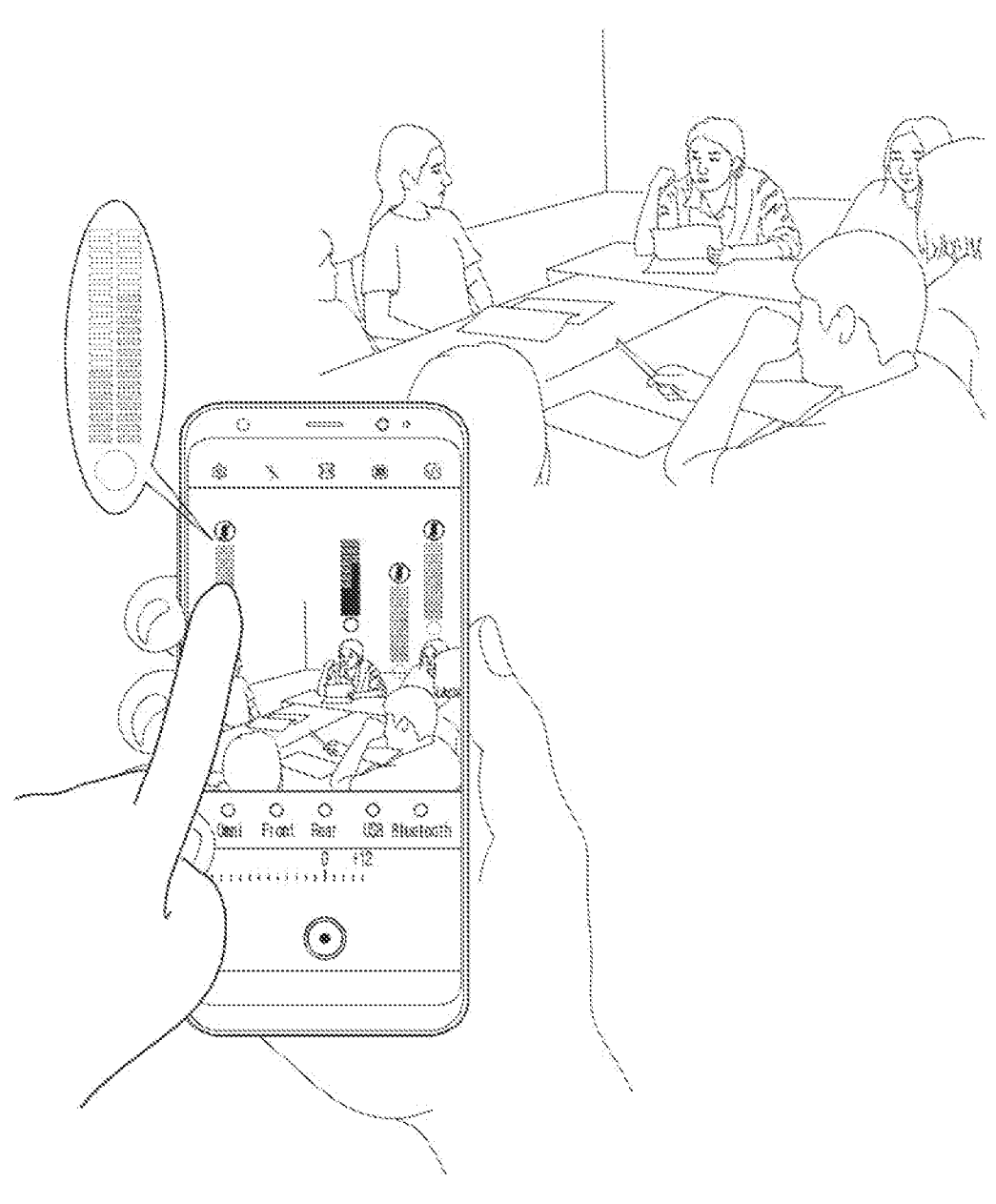
FIG. 20B is a diagram illustrating a UI for controlling a volume of an audio signal of an object according to an embodiment of the disclosure.

FIG. 20A is a diagram illustrating a UI displaying a volume of an audio signal of an object according to an embodiment of the disclosure, and FIG. 20B describes a UI for controlling a volume of an audio signal of an object according to an embodiment of the disclosure.

Referring to FIG. 20A, the electronic device may capture and display an image including a subject. In addition, the electronic device may receive direction information, angle information, and identification information of the external device through a UWB communication method. Also, the electronic device may receive image capture direction information. The electronic device may acquire an audio signal and generate a record thread and a plurality of record tracks. For example, a record thread may correspond to an audio signal acquired from one subject, and a record track may correspond to a plurality of applications being executed. The electronic device may divide an audio signal into a plurality of channels according to a directional mode or a microphone mode according to beamforming conditions. The audio signal divided into a plurality of channels may be displayed as a visualized audio signal on a display through a visualization process or stored in a memory. The electronic device may identify a subject by analyzing the captured image. In addition, the subject and the audio signal may be mapped based on image analysis information and received information. Also, as shown in FIG. 20A, an audio signal may be displayed by mapping it to a subject. Also, as shown in FIG. 20B, the electronic device may control the audio signal for each subject or for each channel.

Figure 21:
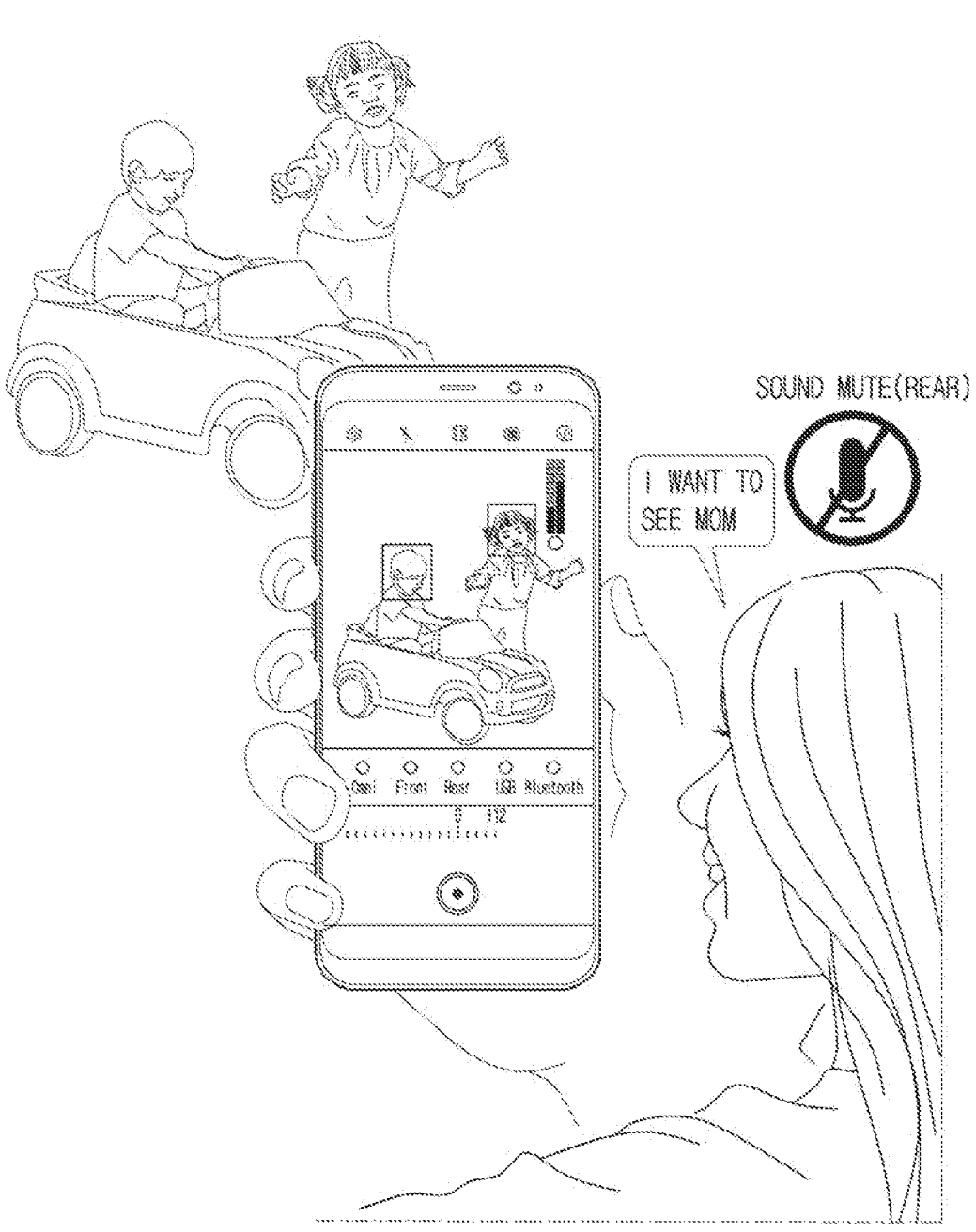
FIG. 21 is a diagram illustrating an embodiment of muting sound of a photographer.

FIG. 21 is a diagram illustrating an embodiment of muting a photographer's sound.

As an example, an electronic device may include a plurality of microphones, and the plurality of microphones may include directional microphones. The directional microphone may acquire an audio signal based on a specific subject.

As shown in FIG. 21, the directional microphone may preferentially acquire children's voices. Also, the directional microphone may mute a mother's voice located in the other direction. Also, the electronic device may record the acquired voice. Meanwhile, the electronic device may display peak level energy during real-time recording.

That is, the electronic device may include a directional microphone, and may remove an audio signal acquired in a direction other than the direction in which the directional microphone is directed.

Figure 22:
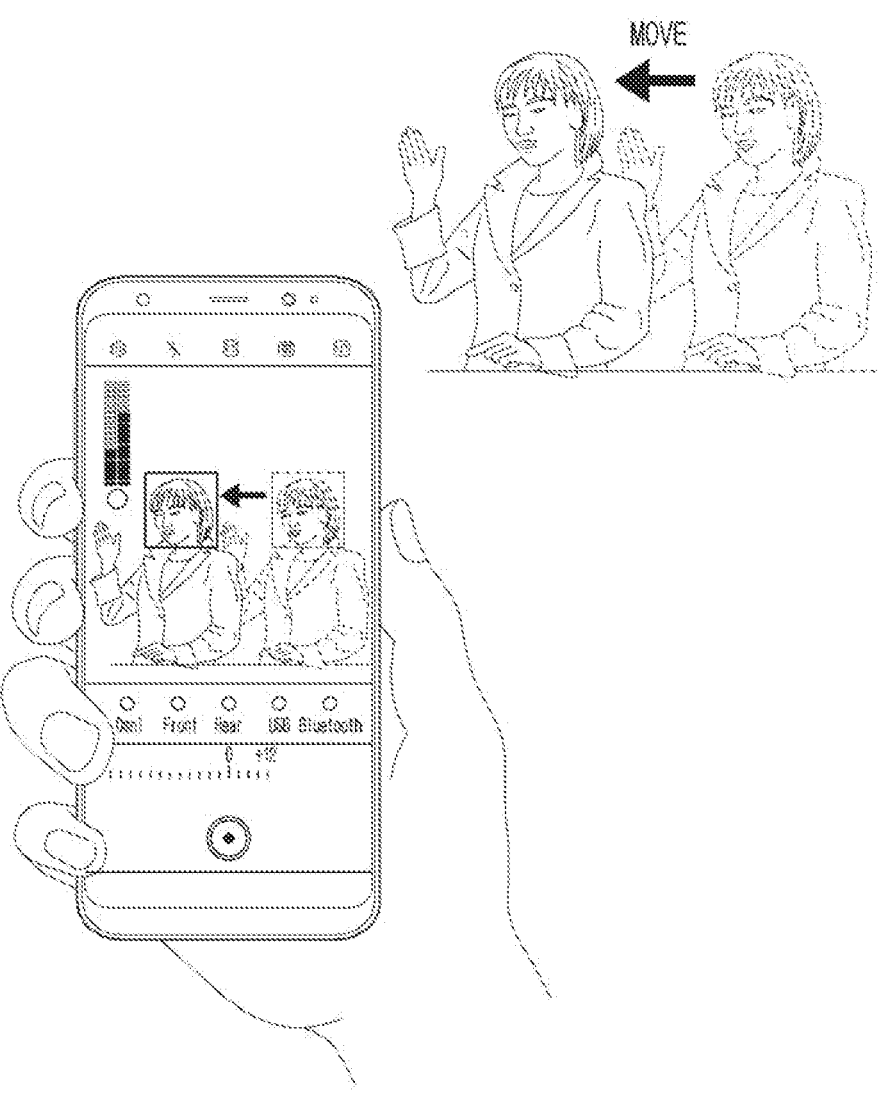
FIG. 22 is a diagram illustrating an embodiment of tracking and displaying sound according to the movement of a subject.

FIG. 22 is a diagram illustrating an embodiment of tracking and displaying sound according to the movement of a subject.

As shown in FIG. 22, the electronic device may track and visualize sound corresponding to a movement of a subject. The electronic device may track the subject using audio acquired from the directional microphone and a face of the subject included in the image. The electronic device may record the sound of a target subject by tracking the subject and the subject's voice. Also, the electronic device may display peak level energy during real-time recording.

Figure 23:
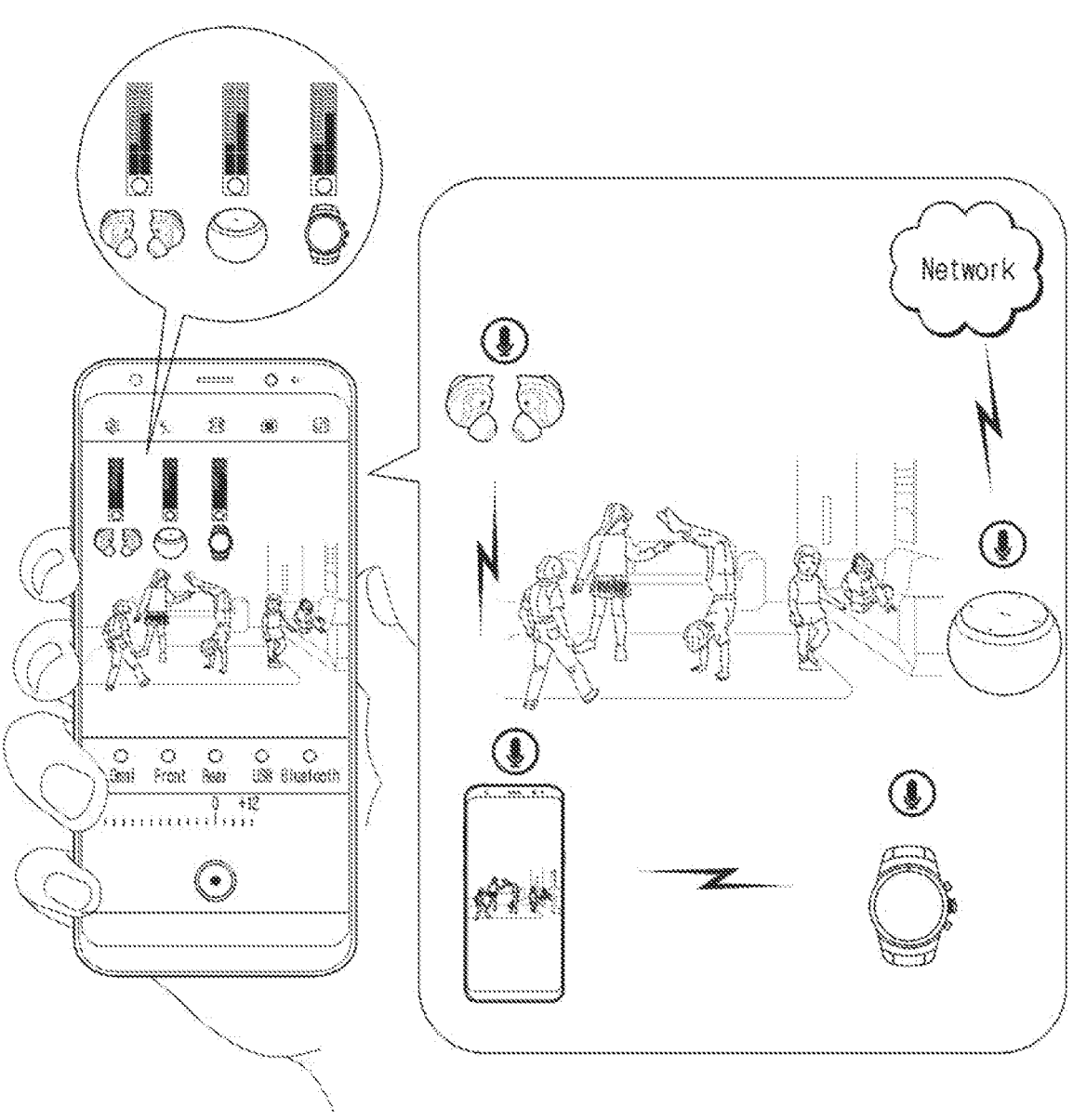
FIG. 23 is a diagram illustrating an embodiment of separately displaying and controlling audio signals of a plurality of external devices.

FIG. 23 is a diagram illustrating an embodiment of separately displaying and controlling audio signals of a plurality of external devices.

Referring to FIG. 23, the electronic device may connect one or more external devices and simultaneously display or control an audio signal. As described above, the electronic device may generate a plurality of multi-record threads according to the number of audio signals and generate a plurality of record tracks under the multi-record threads. Also, the electronic device may separate the acquired audio signal into a plurality of channels. Accordingly, the electronic device may display or store all of the audio signals acquired from a plurality of devices, and may individually control the acquired audio signals. Also, the electronic device may display peak level energy of an audio signal corresponding to each external device in real time.

The control method of an electronic device according to various embodiments described above may be provided as a computer program product. The computer program product may include the S/W program itself or a non-transitory computer readable medium storing the S/W program.

The non-transitory computer readable medium is a medium that semi-permanently stores data therein, rather than a medium storing data for a short time, such as a register, a cache, a memory, or the like, and is readable by a device. In detail, various applications or programs described above may be stored and provided in the non-transitory computer readable medium, such as a compact disk (CD), a digital versatile disk (DVD), a hard disk, a Blu-ray disk, a universal serial bus (USB), a memory card, and a read only memory (ROM).

While the disclosure has been described with reference to the embodiments, the disclosure is not limited to the aforementioned specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An electronic device comprising:

a communication interface configured to communicate with an external device using ultra-wide band (UWB);

a microphone configured to receive an audio signal;

a camera configured to capture an image including a subject adjacent to the external device;

a sensor configured to detect a direction of the camera;

a display configured to display the captured image;

at least one memory configured to store at least one instruction; and at least one processor, wherein the at least one processor is in operative communication with the communication interface, the microphone, the camera, the sensor, the display, and the memory, and is configured to execute the at least one instruction to:

acquire ranging information and angle information with respect to the external device based on data received from the external device, acquire image capture direction information based on the direction of the camera detected by the sensor, identify the external device for acquiring an audio signal of the subject based on the acquired image capture direction information, ranging information, and angle information, control the microphone to acquire an audio signal of the subject when a distance to the external device is less than a predetermined distance, control the communication interface to acquire the audio signal of the subject from the external device when the distance to the external device is greater than or equal to a predetermined distance, wherein the audio signal acquired by the communication interface is received through at least one of a microphone of the external device or a wireless device that is communicatively connected to the external device, and control the display to display a user interface (UI) indicating a magnitude of the acquired audio signal together with the captured image, wherein the at least one processor is further configured to execute the at least one instruction to:

identify whether a record thread is in an active state, and based on identifying the record thread as being in the active state, generate a plurality of record tracks related to the acquired audio signal, and connect the plurality of record tracks related to the acquired audio signal to the record thread in the active state to form multiple record threads.

2. The electronic device of claim 1, wherein the at least one processor is further configured to execute the at least one instruction to:

based on identifying the record thread as being in an inactive state, perform an initial recording setting process to store the acquired audio signal, generate the record thread, generate a plurality of record tracks for the generated record thread, store data related to the acquired audio signal in the at least one memory based on the plurality of generated record tracks, and display the data on the display.

3. The electronic device of claim 2, wherein the initial recording setting process comprises at least one of a codec setting process, an audio DSP setting process, a kernel driver setting process, or an audio hardware abstraction layer (HAL) setting process.

4. The electronic device of claim 2, wherein the at least one processor is further configured to execute the at least one instruction to identify a peak level of the acquired audio signal using at least one record track related to the audio signal from the plurality of generated record tracks.

5. The electronic device of claim 4, wherein the at least one processor is further configured to execute the at least one instruction to control the display to display the identified peak level as a magnitude of the acquired audio signal.

6. The electronic device of claim 2, wherein the at least one processor is further configured to execute the at least one instruction to:

determine whether the acquired audio signal satisfies a beamforming condition, based on determining that the acquired audio signal satisfies the beamforming condition, separate the acquired audio signal into a plurality of channels based on directionality and store the plurality of channels in the at least one memory, and based on determining that the acquired audio signal does not satisfy the beamforming condition, separate the acquired audio signal into a plurality of channels based on a number of microphones and store the plurality of channels in the at least one memory.

7. The electronic device of claim 6, wherein the at least one processor is further configured to execute the at least one instruction to control a volume of the audio signal for each record track or each channel.

8. The electronic device of claim 1, wherein the at least one processor is further configured to execute the at least one instruction to:

control the communication interface to transmit a response request signal to the external device and to receive a response signal, and acquire the ranging information based on an elapsed time between a time at which the response request signal is transmitted to a time at which the response signal is received.

9. The electronic device of claim 1, wherein the microphone comprises a directional microphone, and wherein the at least one processor is further configured to execute the at least on instruction to: mute an audio signal acquired through the microphone from a direction other than a direction in which the directional microphone is directed.

10. A method of controlling an electronic device comprising:

capturing an image including a subject adjacent to an external device;

acquiring ranging information and angle information with respect to the external device based on data received from the external device via ultra-wide band (UWB) communications;

acquiring image capture direction information based on a direction of a camera detected by a sensor;

identifying the external device for acquiring an audio signal of the subject based on the acquired image capture direction information, ranging information, and angle information;

controlling a microphone to acquire an audio signal of the subject when a distance to the external device is less than a predetermined distance;

acquiring the audio signal of the subject through the external device when the distance to the external device is greater than or equal to a predetermined distance, wherein the audio signal of the subject acquired through the external device is received through at least one of a microphone of the external device or a wireless device that is communicatively connected to the external device; and displaying a user interface (UI) indicating a magnitude of the acquired audio signal together with the captured image, wherein the method further comprises:

identifying whether a record thread is in an active state; and based on identifying the record thread as being in the active state, generating a plurality of record tracks related to the acquired audio signal, and connecting the plurality of record tracks related to the acquired audio signal to the record thread in the active state to form multiple record threads.

11. The method of claim 10, further comprising:

based on identifying the record thread as being in an inactive state, performing an initial recording setting process to store the acquired audio signal in a memory, generating the record thread, generating a plurality of record tracks for the generated record thread, and storing and displaying data related to the acquired audio signal based on the plurality of generated record tracks.

12. The method of claim 11, wherein the initial recording setting process comprises at least one of a codec setting process, an audio DSP setting process, a kernel driver setting process, or an audio hardware abstraction layer (HAL) setting process.

13. The method of claim 11, further comprising:

identifying a peak level of the acquired audio signal using at least one record track related to the audio signal from the plurality of generated record tracks.

14. An electronic device comprising:

a camera configured to capture an image including a subject adjacent to one or more external devices;

a sensor configured to detect a direction of the camera;

a communication interface configured to communicate with an external device from among the one or more external devices using ultra-wide band (UWB);

a microphone configured to receive an audio signal;

a display configured to display the captured image;

at least one memory configured to store at least one instruction; and at least one processor, wherein the at least one processor is in operative communication with the communication interface, the microphone, the camera, the sensor, the display, and the memory, and is configured to execute the at least one instruction to:

identify, based on the captured image, an external device that is adjacent to the subject from among the one or more external devices, acquire ranging information and angle information with respect to the identified external device based on data received from the identified external device, acquire image capture direction information based on the direction of the camera detected by the sensor, control the microphone to acquire an audio signal of the subject when a distance to the identified external device is less than a predetermined distance, control the communication interface to acquire the audio signal of the subject from the identified external device when the distance to the identified external device is greater than or equal to a predetermined distance, wherein the audio signal acquired by the communication interface is received through at least one of a microphone of the external device or a wireless device that is communicatively connected to the external device, and control the display to display a user interface (UI) indicating a magnitude of the acquired audio signal together with the captured image, wherein the at least one processor is further configured to execute the at least one instruction to:

identify whether a record thread is in an active state, and based on identifying the record thread as being in the active state, generate a plurality of record tracks related to the acquired audio signal, and connect the plurality of record tracks related to the acquired audio signal to the record thread in the active state to form multiple record threads.

15. The electronic device of claim 14, wherein the at least one processor is further configured to execute the at least one instruction to:

based on identifying the record thread as being in an inactive state, perform an initial recording setting process to store the acquired audio signal, generate the record thread, generate a plurality of record tracks for the generated record thread, store data related to the acquired audio signal in the at least one memory based on the plurality of generated record tracks, and display the data on the display.

16. The electronic device of claim 15, wherein the at least one processor is further configured to execute the at least one instruction to:

determine whether the acquired audio signal satisfies a beamforming condition, based on determining that the acquired audio signal satisfies the beamforming condition, separate the acquired audio signal into a plurality of channels based on directionality and store the plurality of channels in the at least one memory, and based on determining that the acquired audio signal does not satisfy the beamforming condition, separate the acquired audio signal into a plurality of channels based on a number of microphones and store the plurality of channels in the at least one memory.

17. The electronic device of claim 14, wherein the at least one processor is further configured to execute the at least one instruction to:

control the communication interface to transmit a response request signal to the identified external device and to receive a response signal, and acquire the ranging information based on an elapsed time between a time at which the response request signal is transmitted to a time at which the response signal is received.

* * * * *